(12) United States Patent
Tsubouchi et al.

(10) Patent No.: US 6,345,565 B1
(45) Date of Patent: Feb. 12, 2002

(54) VACUUM SERVO UNIT FOR VEHICLE BRAKE SYSTEMS

(75) Inventors: Kaoru Tsubouchi, Toyota; Akihiko Miwa, Anjo, both of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/366,041

(22) Filed: Aug. 2, 1999

(30) Foreign Application Priority Data

Jul. 31, 1998 (JP) .......................................... 10-217093
Sep. 30, 1998 (JP) .......................................... 10-278401

(51) Int. Cl.[7] .................................................. F15B 9/10
(52) U.S. Cl. ........................................ 91/367; 91/376 R
(58) Field of Search ................................ 91/367, 376 R

(56) References Cited

U.S. PATENT DOCUMENTS 5,487,325 A * 1/1996 Bayliss et al. ............ 91/376 R

FOREIGN PATENT DOCUMENTS

| DE | 195 34 222 | 3/1997 |
|----|------------|--------|
| JP | 57-130845 | 8/1992 |
| WO | 92/18366 | 10/1992 |

* cited by examiner

*Primary Examiner*—F. Daniel Lopez
(74) *Attorney, Agent, or Firm*—Burns, Doane, Swecker & Mathis, LLP

(57) ABSTRACT

A vacuum servo booster 10 for vehicle brake systems includes a housing 14, movable walls 17 and 20, a power piston 22, an input member 28, an input rod connected to a brake pedal 80, a valve mechanism 34, an output rod 49, and an actuator 41. In the vacuum servo booster 10, the input rod 27 has a front portion 271 and a rear portion 272 which are telescopically connected at a portion 273 within the power piston 22.

16 Claims, 12 Drawing Sheets

VACUUM SERVO UNIT FOR VEHICLE BRAKE SYSTEMS

BACKGROUND OF THE INVENTION

1. Field of the Invention

The present invention relates to a vacuum servo unit for vehicle brake systems.

2. Related Art

A conventional vacuum servo unit or booster is disclosed in, for example, Japanese patent Laid-open Print No. Sho. 57 (1982)-130845 published on Aug. 13, 1982, without examination. In this vacuum servo unit, an input rod which serves for transmitting a force from a brake pedal to a power piston is divided into two axial portions which are telescopically connected. The purpose of such a division of the input rod is to advance the power piston for activating the vacuum servo unit automatically even when the brake pedal is not depressed.

In order to establish smooth relative movement between the two axial portions of the input rod, a sufficient amount of a lubrication material is provided between the rod portions.

However, because this telescopic connection is made outside a casing or housing in which the power piston is located, the lubrication material may sometimes drop down near the driver's feet. Thus, the driver's feet and the neighboring vehicle body floor may become dirty.

SUMMARY OF THE INVENTION

In light of the foregoing, a vacuum servo unit is desired which is free from the foregoing drawbacks.

In order to attain the foregoing objects, an exemplary embodiment of the present invention provides a vacuum servo unit for vehicle brake systems comprising:

- a housing defining therein at least a pressure space;
- a movable wall provided in the housing so as to be capable of advance and retract along an axial direction of the housing, the movable wall dividing the pressure space into a front chamber and a rear chamber;
- a power piston coupled to the movable wall;
- an input member fitted in the power piston so as to be movable back and forth along the axial direction of the housing;
- an input rod having a front portion and a rear portion, the front portion being coupled to the input member, the rear portion being coupled to a brake operation member, the front portion being in engagement with the rear portion within the power piston in such a manner that the front portion is movable relative to the rear portion, the input rod being movable along the axial direction of the housing together with the brake operation member;
- a valve mechanism having an atmosphere valve and a negative pressure valve, the valve mechanism establishing a fluid communication between the rear chamber and the atmospheric pressure by opening the atmosphere valve which provides an advancing power to the power piston in simultaneous with an interruption a fluid communication between the rear chamber and the front chamber which is caused by closing the negative pressure valve when a stroke of the input member causes by the depression of the brake operation member exceeds a set value;
- an output member establishing an outer-housing outputting of the advancing power of the power piston caused by the depression of the brake operation member; and
- an actuator providing a different advancing power to the power piston independent of the brake operation member.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings, in which.

DETAILED DESCRIPTION OF PREFERRED EMBODIMENTS

Preferred embodiments of the present invention will be described hereinafter in detail with reference to the accompanying drawings.

Figure 1:
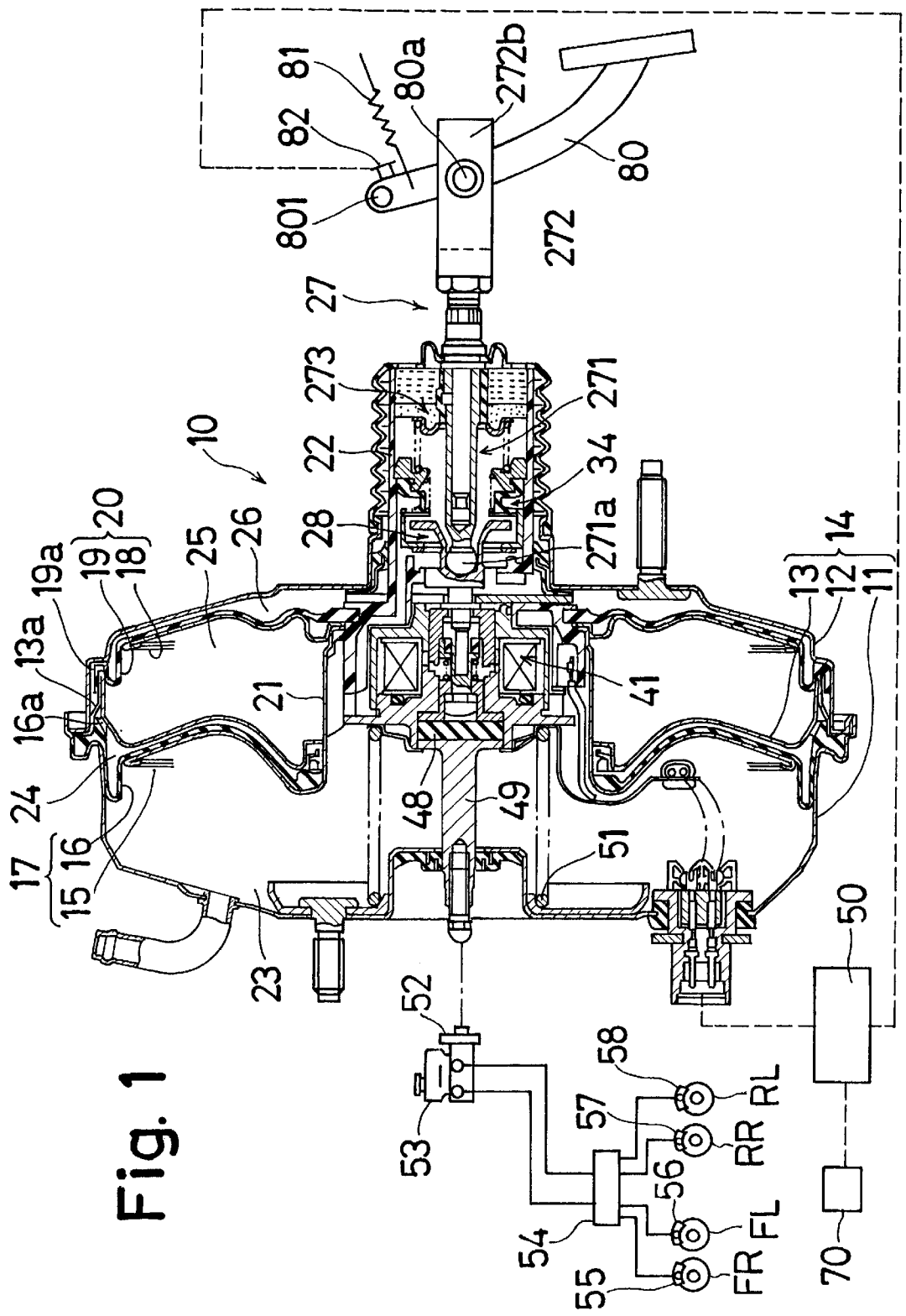
FIG. 1 illustrates a cross-sectional view of a first embodiment of a vacuum servo unit in accordance with the present invention.
Figure 2:
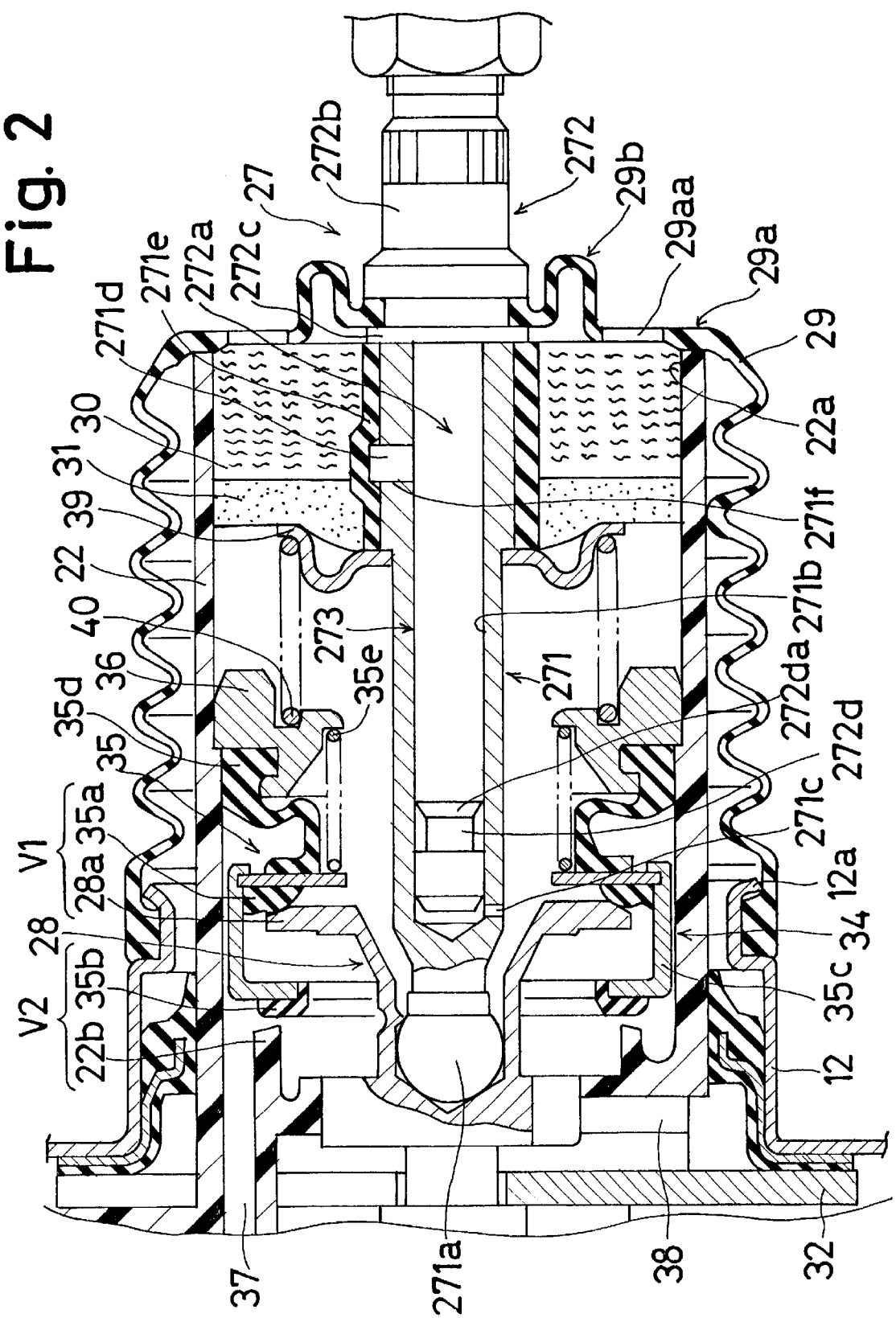
FIG. 2 illustrates an enlarged cross-sectional view of a valve mechanism of the vacuum servo unit illustrated in FIG. 1.
Figure 3:
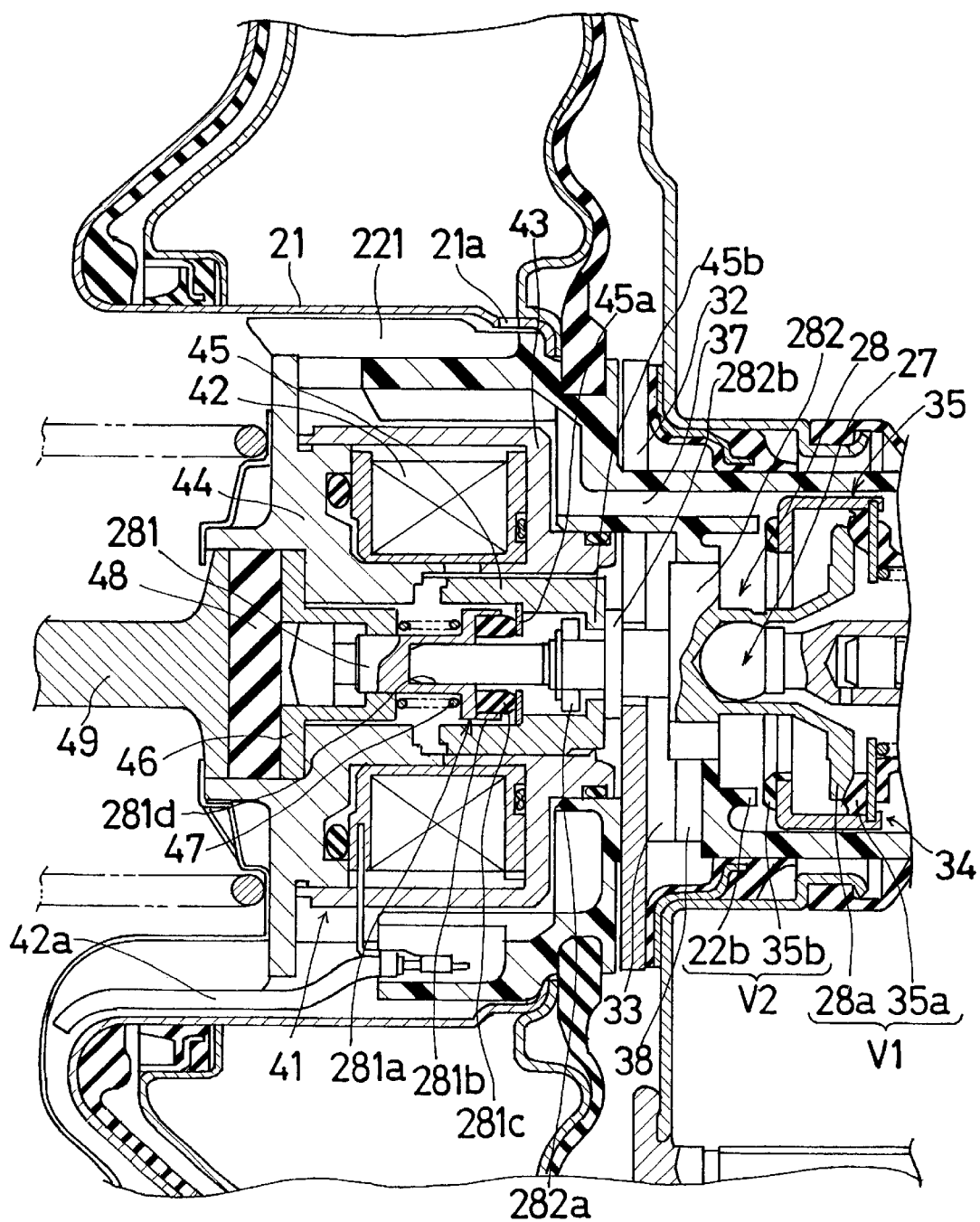
FIG. 3 illustrates an enlarged cross-sectional view of an actuator of the vacuum servo unit illustrated in FIG. 1.

Referring first to FIGS. 1 to 3 inclusive, there is illustrated a tandem type vacuum servo unit 10 for vehicle brake systems. The vacuum servo unit 10 includes a housing 14 which has a front shell 11, a rear shell 12, and a dividing member 13 interposed therebetween. In the housing 14, on opposite sides of the dividing member 13, a front side pressure chamber and a rear side pressure chamber are defined. In the front side pressure chamber of the housing 14, there is provided a front side wall 17 having a metallic plate 15 and an elastic, e.g., rubber, diaphragm 16 so as to be movable back and forth along an axial line X of the housing 14, while in the rear side pressure chamber of the housing 14, there is provided a rear side wall 20 having a metallic plate 18 and an elastic, e.g., rubber, diaphragm 19 so as to be movable back and forth along the axial line of the housing 14.

The metallic plate 15 has at its center portion an integral cylinder portion 21 which passes through a center portion of the dividing member 13 in a slidable and fluid-tight manner. An inner periphery of the diaphragm 16, which is in the form of a bead configuration, is secured to an outer surface of a front end portion of the cylinder portion 21 in a fluid-tight manner. An outer periphery of the diaphragm 16, which is formed into a bead configuration, and an outer periphery of the dividing member 13 are fluid-tightly held between outer peripheries of the front and rear shells 11 and 12.

An outer periphery of the rear side diaphragm 19 is formed into a bead configuration and is held in a fluid-tight manner between a stepped portion of the rear shell 12, which is near the outer periphery of the rear shell, and a folded portion at an outer periphery of the dividing member 13. An outer surface of a front side portion of a power piston 22, which passes through a rear opening 12a (see FIG. 2) of the rear shell 12 in a slidable and fluid-tight manner, is connected with a rear and portion of the cylinder portion 21, an inner periphery of the rear plate 18, and an inner periphery in the form of a bead portion of the rear side diaphragm 19.

The foregoing arrangements define a set of a first front chamber 23 and a first rear chamber 24 and a set of a second front chamber 25 and a second rear chamber 26 in the front side pressure chamber and the rear side pressure chamber, respectively, in the housing 14. The first front chamber 23 is held at a negative pressure by being continually connected to an engine intake manifold (not shown) as a vacuum source. The second front chamber 25 is also kept at the negative pressure by being continual fluid communication with the first front chamber 23 via a hole 21a (see FIG. 3) in the cylinder portion 21 of the front plate 15 and a groove 221 formed in the outer surface of the front side of the power piston 22.

The first rear chamber 24 is in fluid communication with the second rear chamber 26 via a groove 16a formed in an inner surface of the bead-shaped outer periphery of the front side diaphragm 16, a hole 13a formed in the dividing member 13, and a groove 19a formed in the bead-shaped outer periphery of the rear side diaphragm 19.

Within the power piston 22, there is provided an input rod 27 so as to be movable back and forth relative to the power piston. The input rod 27 has a front portion 271 to be accommodated in the power piston 22 and a rear portion 272 whose rear side 272a is projected from the power piston 22 in the outward direction (the rightward direction in FIG. 1).

The front portion 271 of the input rod 27 is formed at its distal end thereof with a spherical portion 271a which is connected to a rear portion of an input member 28 in ball-joint manner, input member 28 which is slidably fitted in the power piston 22 so as to be movable back and forth. The rear portion 272 of the input rod 27 is connected at its rear side 272b with a brake pedal 80 after passing through a board which defines an engine room (not shown).

As best shown in FIG. 2, the front portion 271 of the input rod 27 is provided therein with a blind bore 271b in such a manner that the blind bore 271b extends in the axial direction of the front portion 271 and has a rear opening. The rear portion 272 extends axially in the power piston 22 and has a projection portion 272a which is fitted slidably in the blind bore 271b.

Due to the insertion of the projection portion 272a of the rear portion 272 in the blind bore 271b of the front portion 271, relative axial movement between the front portion 271 and the rear portion 272 is possible. At an initial or rest stage as shown in FIG. 2, rearward movement of the front portion 271 toward the rear portion 272 is restricted when an outer periphery around the rear opening of the blind bore 271b is brought into engagement with a stepped portion 272c between the rear portion 272b and a convex portion of the rear portion 272a. Relative movement between the front portion 271 and the rear portion 272 is established within a range 273.

A passage 271c is formed in a side of the front portion 271 and establishes continual fluid communication between an inner space of the power piston 22 and a space between a bottom of the blind bore 271b of the front portion 271 and the convex portion 272a.

Along a frontward outer periphery of the convex portion 272a of the rear portion 272, there is formed an annular groove 272da having a rear wall which is tapered frontward.

At a rearward portion of the front portion 271 of the input rod 27, a passage 271f is formed which passes through the rearward portion in the radial direction so as to establish a continual direction between the inner space of the blind bore 271b and an outer space of the front portion 271. The passage 271f receives a projection or regulating member 271d, which is movable in passage 271f and whose length is larger than that of the passage 271f.

The outer portion of rear side of the front portion 271 is provided thereon with an elastic, e.g., rubber, cylindrical member 271e which elastically urges member 271d radially inward. In the initial state as illustrated in FIG. 2, an inner end of the member 271 is in engagement with an outer surface of the rearward of the rear portion 272.

The vacuum servo unit 10 has an elastic, e.g., rubber, cover member 29 whose front and rear ends are connected to a portion surrounding the opening 12a of the rear shall 12 and the outer surface of the rear portion 272 of the input rod 27, respectively. The cover member 29 is so formed as to have a front opening portion and a rear bottom portion and when assembled to both of the rear shell 12 and the input rod 27 closes the rear opening 22a of the power piston 22 in addition to covering a rearward extension of the power piston from the rear shell 12.

A rearward portion of the cover member 29 engages the input rod 27 and has an annular potion 29a and a rolling portion 29b. In the rear opening 22a of the power piston 22, there are provided a filter 30 and a sound-absorbing member 31. The inner space of the power piston is in fluid communication with an outside space or atmosphere via the sound-absorbing member 31, the filter 30, and a plurality of circumferentially arranged, equally spaced apertures 29aa in the cover member 29.

Referring to FIG. 3, the input member 28 includes a first member 281 and a second member 282. The first member 281 is within a frontward side of the power piston 22 and is in abutment with a rear side of a reaction disc 48 as will be explained in greater detail below. The second input member 282 positioned at a rearward side of the first input member 281, coaxially therewith, and is connected to the input rod 27.

The first input member 281 has a blind bore 281d which opens rearwardly in which a front end of the second input member 282 is fitted so as to be movable in the axial direction (horizontal direction in FIG. 3). Thus, the first input member 281 is movable in the axial direction relative to the second input member 282. In the initial stage shown in FIG. 3, a bottom of the blind bore 281d of the first input member 281 is in abutment with a front end of the second input member 282.

The power piston 22 is provided with a key member 32 which regulates a fully extended position and a fully retracted position of the input member 28 relative to the power piston 22. The key member 32 is fitted in a radially extending aperture 33 in the power piston 22 and is secured thereto so as not to be extracted therefrom.

Within the power piston 22, there is provided a valve mechanism 34 which establishes, depending on an axial position or displacement of the input member 28 relative to the power piston 22, an output force decrease condition, an output force maintaining condition, and an output force increasing condition. In the output force decreasing condition, the second rear chamber 26 is in fluid communication with the first front chamber 23 and isolated from the atmosphere. Under the output force maintaining condition, the second rear chamber 26 is isolated from both the first front chamber 23 and the atmosphere. In the output force increasing condition, the second rear chamber 26 is in communication with the atmosphere and isolated from the first front chamber 23.

The valve mechanism 34 includes a first or atmospheric pressure valve seat 28a, a second or negative pressure valve seat 22b, and a control valve 35. The first valve seat 28a is formed into an annular or rig shaped configuration on the second input member 282 and is oriented in the rearward direction (rightward direction in FIG. 3). The second valve seat 22b is formed on the power piston 22 integrally therewith and is oriented in the rearward direction. The control valve 35 has an atmospheric pressure sealing portion 35a which opposes the first valve seat 28a so as to be engaged or disengaged therewith, and a negative pressure sealing portion 35b which opposes to the second valve seat 22b so as to be engaged or disengaged therewith. The sealing portions 35a and 35b are formed into a substantially ring shaped structure.

As shown in FIGS. 2 and 3, the control valve 35 includes a movable portion 35c which is integral with the sealing portions 35a and 35b, a stationary portion 35d secured to the power piston 22 in fluid-tight manner by a retainer 36, and a valve spring 35e which urges the movable portion 35c in the frontward direction.

In the valve mechanism 34, the sealing portion 35a and the first valve seat 28a constitute an atmospheric pressure valve V1, while the sealing portion 35b and the second valve seat 22b constitute a negative pressure valve V2.

In the power piston 22, there are formed a vacuum passage 37 and an air passage 38. The vacuum passage 37 connects the negative pressure valve V2 of the valve mechanism 34 to the first front chamber 23, while the air passage 38 connects the atmospheric pressure valve V1 of the valve mechanism 34 to the second rear chamber 26. Within the power piston 22, stationary portion 35d thereof is in fluid communication with the atmosphere via the sound-absorbing member 31, the filter 30, and the rear opening 22a of the power piston 22.

In the valve mechanism 34, when the valve seat 28a of the atmospheric pressure valve V1 is engaged and disengaged with the sealing portion 35a, the second rear chamber 26 is isolated from and in fluid communication with, respectively, the atmosphere, and when the valve seat 22b of the negative pressure valve V2 is engaged and disengaged with the sealing portion 35b, fluid communication between the first front chamber 23 and the second rear chamber 26 is interrupted and established, respectively.

A spring 40 is interposed between a retainer 36 and a retainer 39 which is mounted on the front portion 271 of the input rod 27 and urges the input rod 27 and the input member 28 in the rearward direction so as establish a continual condition under which the atmospheric pressure valve seat 28a is engaged with the sealing portion 35a and the negative pressure valve seat 22b is out of engagement with the sealing portion 35b when a brake pedal 80 is not depressed or the initial stage as shown in FIG. 2 is maintained. It is to be noted that in such an initial stage, a gap or clearance is defined between the negative pressure valve seat 22b and the sealing portion 35b.

As shown in FIG. 3, an actuator 41 is accommodated in an inside of the front portion of the power piston 22. The actuator 41 includes or is made up of a solenoid coil 42, a yoke 43 formed of a magnetic material, a stationary core 44 formed of a magnetic material, and a movable core 45 formed of a magnetic material.

The movable core 45 is provided around the input member 22 so as to be movable in the axial direction (the horizontal direction in FIG. 3) relative to the power piston 22 and the input member 28. The movable core 45 is of a substantially cylindrical shape and has a first inward flange 45a and a second inwardly projecting flange 45b rearward of the first inward projection 45a.

The first member 281 is formed at its rear portion with a first engaging portion 281a which is in engagement with the first inward flange 45a. The first engaging portion 281a has a cylinder portion 281b having a rear opening and an elastic, e.g., rubber, ring member 281c positioned in the cylinder portion 281b. An axial length of the ring member 281c is set to be larger than that of a depth of the cylinder portion 281b. A clearance is defined between a rear portion of the cylinder portion 281 and the first inward flange 45a when in the initial stage.

The second member 282 is provided at its front portion with a first outward flange 282a. In the initial stage as shown in FIG. 3, a clearance is defined between the first outward flange 282a and the second inward flange 45b of the movable core 45.

The second member 282 is positioned at a rearward side of the first outward flange 282a and has a second outer flange 282b which is engagable with the second inward flange 45b of the movable core 45. At the initial stage, the second outer flange 282b is in engagement with the second inward flange 45b of the movable core 45.

A spring 47 is interposed between a rear side of a guide member 46 fitted in a smaller portion of a stepped bore and the first engaging portion 281a of the first member 28. The spring 47 urges the movable core 45 via the first member 281 in the rearward direction, thereby bringing the second outward flange 45b of the movable core 45 into engagement with a front side of the second outward flange 282b of the second member 282 under the initial stage.

Thus, the movable core 45 can move back and forth together with the input member 28 relative to the power piston 22. A guide member 46 slidably supports axial movement of the first member 281.

The solenoid coil 42 is positioned around the movable core 45. The solenoid coil 42, the yoke 43, and the stationary core 44 are fixedly mounted to the power piston 22. The solenoid coil 42 is electrically coupled via a pair of lead wires 42a to an electronic control device 50 outside the housing 14.

While the solenoid 42 is de-energized, meaning an inactive condition of the actuator 42, a clearance is set between the front side of the movable core 45 and the stationary core 44.

If the solenoid 42 is energized for activating the actuator 41, a magnetic attraction force is generated between the stationary core 44 and the movable core 45, thereby moving the movable core 45 in the frontward direction. The maximum stroke of the movable core 45 corresponds to the clearance between the stationary core 44 and the movable core 45 shown in FIG. 3.

In a larger portion of the stepped bore in the front side of the stationary core 44, a rubber reaction disc 48, which is a substantially circular plate is provided. At a front side of the reaction disc 48, the large portion of the stepped bore of the stationary core 44 slidably receives an output rod 49 which passes through a center of the front shell 11 of the housing 14 in fluid-tight manner and in slidable manner.

The reaction disc 48 is used, as is well known, to transmit prompting forces of the power piston 22 and the input member 28 to the output rod 49 and concurrently offers a reaction force whose magnitude corresponds to an output force from the output rod 49 to the input member 28 for retraction thereof. In the initial stage, a clearance is defined between a rear end of the reaction disc 48 and a front end of the first member 281.

The output rod 49 is associated with a piston (not shown) of a master cylinder 52 on which a reservoir tank 53 is mounted. The master cylinder 52 is connected via piping to an actuator division 54 for an ABS (antilock brake system), a TRC (traction control), and a brakesteering control (such as VSC). The actuator division 54 is in fluid connection with wheel cylinders 55, 56, 57, and 58 provided on rotating wheels FR, FL, RR, and RL, respectively.

Figure 4:
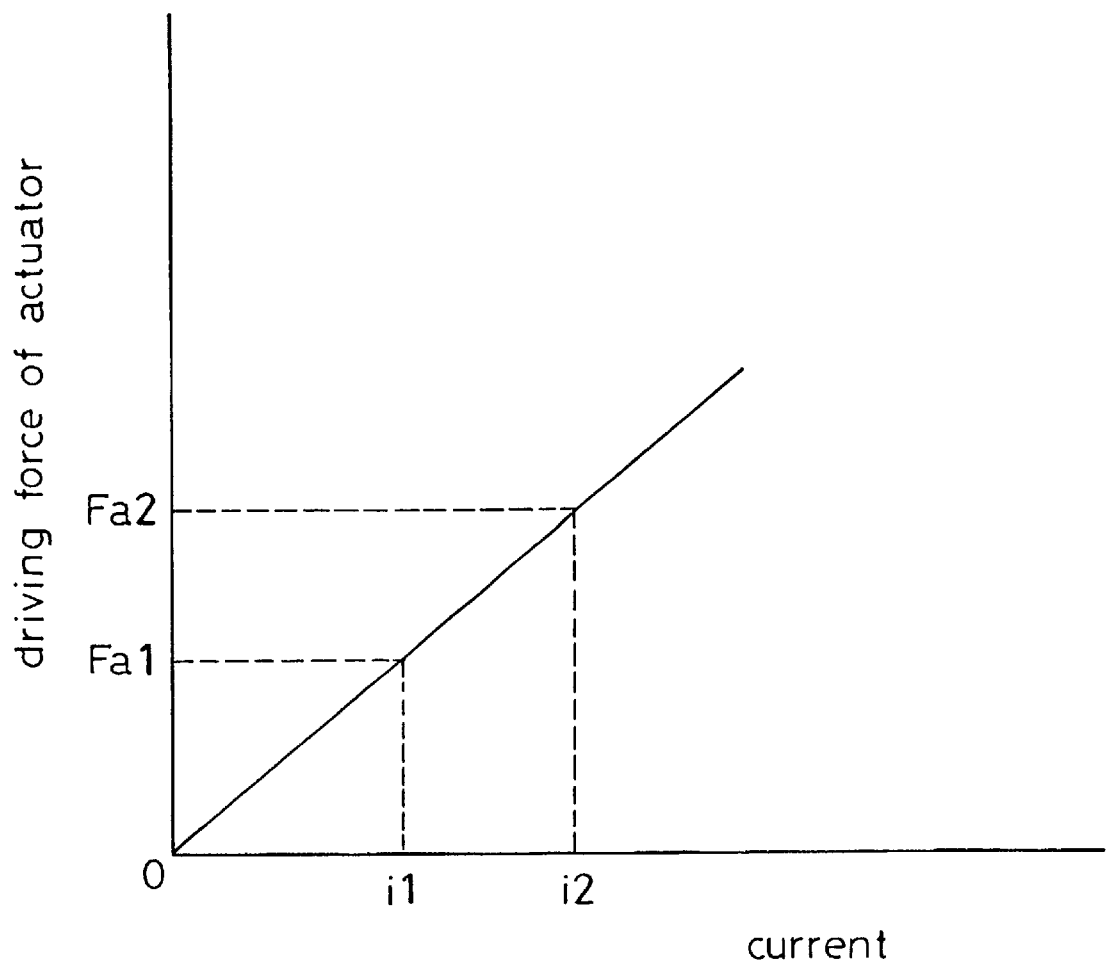
FIG. 4 illustrates a characteristic graph showing a relation between a current and a driving force which are applied to and derived from the actuator, respectively.

FIG. 4 illustrates a relationship between a current 'i' flowing through the solenoid 42 of the vacuum servo unit 10 and a driving force derived from the actuator 41, wherein when an amount ii (i2) of current flows through the solenoid 42 an amount F1 (F2) of driving force can be derived from the actuator 41.

Operation of the unit 10 will now be described with reference to the drawing figures. FIGS. 1 through 3 depict a condition under which the brake pedal 80 is not depressed, the actuator 41 is inactive, and the valve mechanism 34 takes an output decreasing condition under which a fluid communication is established between the second rear chamber 26 and the first front chamber 23 while isolating the chamber 26 from the atmosphere. In detail, the valve seat 28a is in engagement with the sealing portion 35a, while the valve seat 22b is out of engagement with the sealing portion 35b, whereby the pressure in the first rear chamber 24 and the pressure in the second rear chamber 26 drop down to the same as the pressure in the first front chamber 23.

Thus, no prompting force is applied to each of the movable walls 17 and 20 and the power piston 22, whereby these members 17, 20, and 22 are held at the retracted positions, respectively, by the return spring 51.

The brake pedal 80 is urged by a return spring 81 so as to be rotated about a pivot 801 in the counterclockwise direction and is brought into engagement with a stopper 82. Such a position of the brake pedal 80 is defined as its initial position.

Figure 5:
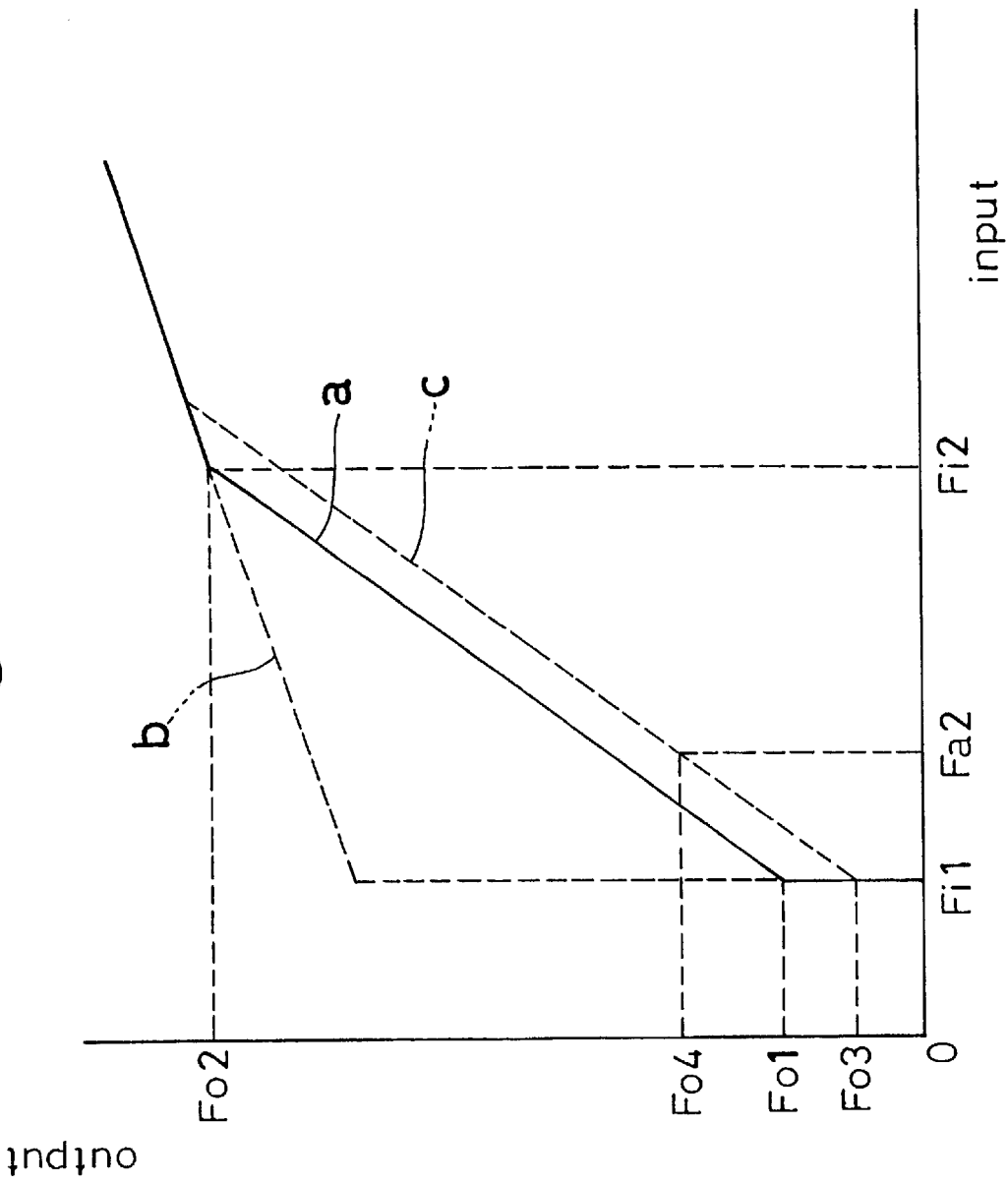
FIG. 5 illustrates a characteristic graph of an input-output of the vacuum servo unit illustrated in FIG. 1.

FIG. 5 illustrates a characteristic graph of the unit 10. In this graph, the ordinate and the abscissa denote an output and an input of the unit 10, respectively. As can be seen from FIGS. 1 through 5, for normal brake operation, if a driver (not shown) depresses the brake pedal 80 with an input force or degree Fi1, the rear portion 272 of the input rod 27 is advanced relative to the power piston 22 because the rear part 272b of the rear portion 272 of the input rod 27 is pivotally connected at 80a to pedal 80.

Forward or advance movement of the rear portion 272 of the input rod 27 causes a concurrent advance movement of the front portion 271 of the input rod 27. The reason is that the stepped portion of the rear portion 272 is in engagement with the rear portion of the front portion 271 of the input rod 27. Thus, the combination of the front portion 271 and the rear portion 272 which constitutes the input rod 27 is advanced against the urging force of the spring 40 relative to the power piston 22.

The input rod 27 causes a concurrent advance movement of the second member 282 of the input member 28. Due to the fact that the bottom of the blind bore 281d of the first member 281 is urged by the front end of the second member 282, the second member 282 and the first member 281, which constitute the input member 28, advance together with the input rod 27.

In addition, the second outward flange 282b of the second member 282 is in engagement with the second inward flange 45b of the movable core 45, whereby the movable core 45 advances together with the input member 28 relative to the power piston 22.

As the input member 28 advances, the movable portion 35c of the control valve 35 moves forward therewith by the frontward urging of the valve spring 35e, which causes engagement of the negative pressure sealing portion 35b of the control valve 35 with the negative pressure valve seat 22b of the power piston 22, thereby closing the negative pressure valve V2.

Immediately upon closure of the negative pressure valve V2, the fluid communication between the vacuum passage 37 and the air passage 38 is interrupted, thereby isolating the second rear chamber 26 from the first front chamber 23. Thus, the valve mechanism 34 is switched from the output decreasing mode to the output maintaining mode.

In the resultant condition, if the input rod 27 and the input member 28 are further advanced forward, the atmospheric pressure valve seat 28a of the input member 28 is moved away from the atmospheric pressure sealing portion 35a, thereby opening the atmospheric pressure valve V1.

Upon opening of the atmospheric pressure valve V1, the air passage 37 is brought into fluid communication with the atmosphere via the clearance between the valve seat 28a and the seal portion 35a, the inside of the control valve 35 in the power piston 22, the sound absorbing member 31, the filter 30, the rear opening 22a of the power piston 22, and the aperture 29aa of the cover member 29, which causes an introduction of air into the second rear chamber 26, thereby switching the valve mechanism 34 into the output increase mode.

The resultant air introduced into the second rear chamber 26 flows further into the first rear chamber 24, thereby increasing the pressures in the respective rear chambers 24 and 26. Thus, a prompting force is generated across the first movable wall 17 due to the pressure difference between the first front chamber 23 and the first rear chamber 24, a prompting force is generated across the second movable wall 20 due to the pressure difference between the second front chamber 25 and the second rear chamber 26, and a prompting force is generated across the power piston 22 due to the pressure difference between the first front chamber 23 and the second rear chamber 26.

The sum of these prompting forces is transmitted from the power piston 22 to the output rod 49 via the stationary core 44 of the actuator 41 and reaction disc 48, the walls 17 and 20, the power piston 22, and the output rod 49 begin to advance as one unit relative to the power piston 22, and the master cylinder 52 is activated.

At this time, the power piston 22 advances relative to the input member 28, thereby moving the atmospheric pressure sealing portion 35a of the control valve 35 to the atmospheric pressure valve seat 28a. In addition, the reaction disc 48 is brought into extension into the hole in the guide member 46 after being deformed in the rearward direction which is due to the compression of the guide member 46 by the power piston 22 and the output rod 49. Such a deformed extension of the reaction disc 48 is used for compensating the clearance between the reaction disc 48 and the input member 28 at the time when the seat valve 28a is moved away from the sealing portion 35a and a newly established clearance between the reaction disc 48 and the input member 28 due to the advance movement of the power piston 22 relative to the input member 28 when the valve mechanism 35 is transferred to the output increasing mode.

The advance movement of the power piston 22 later causes reengagement of the atmospheric pressure sealing portion 35a of the control valve 35 with the atmospheric pressure valve seat 28a, with the result that the air passage 38 is isolated from the atmosphere, thereby stopping the entrance of air into both the rear chambers 24 and 26. Thus, valve mechanism 34 is placed in the output maintaining mode.

In addition, during the transfer of the valve mechanism 34 from the output increasing mode to the output maintaining mode, though the rearward extension of the reaction disc 48 which causes engagement thereof with the front side of the input member 28, the reaction disc 48 offers a reaction force to the input member 28 which corresponds to the output force from the output rod 49.

At this time, the input force applied from the brake pedal 80 to the input member 28 is Fi1 and the output force derived from the output rod 49 to the master cylinder 52 is Fo1, as shown in FIG. 5.

That is to say, a so-called 'jumping operation' is made in such a manner that the output value directly increases from zero to Fo1 while the input member 28 is supplied with a constant input value Fi1 without being applied with a reaction force from the reaction disc 48.

The master cylinder 52 is supplied with the output force whose magnitude is Fo1 from the vacuum servo unit 10, and the resultant brake fluid under pressure is supplied from the master cylinder 52 via the actuator division 54 to the wheel cylinders 55, 56, 57, and 58, for wheels FR, FL, RR, and RL, respectively. Thus, each of the wheels is supplied with a braking force on the basis of the output force, the magnitude of which is Fo1, from the vacuum servo unit 10.

While the output of magnitude Fo1 is being generated and the valve mechanism 34 takes the output maintaining mode, if the input force applied from the driver via the brake pedal 80 to the input member 28 is increased to a value less than Fi2, a unit of the first member 281 and the second member 282 together advance relative to the power unit 22, i.e., the input member 28 advances relative to the power piston 22, and the atmospheric pressure valve seat 28a is removed from the atmospheric pressure, thereby opening the atmospheric pressure valve V1. Then, the valve mechanism 34 is in the output increasing mode. Thus, the pressure in the respective rear chambers 24 and 26, due to air introduction thereinto, causes an increase of the prompting force of each of the power piston 22, the movable wall 17, and the movable wall 20, thereby establishing further advance movements of the power piston 22, the movable wall 17, and the movable wall 20.

Advance movement of the power piston 22 relative to the input member 28 and the subsequent rearward movement of the input member 28 by receiving the reaction force from the reaction disc 48 causes movement of the atmospheric pressure sealing portion 35a to the atmospheric pressure valve seat 28a. Then, reengagement therebetween is established, thereby closing the atmospheric pressure valve V1. That is to say, the introduction of air into each of the rear chambers 24 and 26 is interrupted and the valve mechanism 34 is switched to the output maintaining mode, thus increasing the prompting force of each of the movable walls 17 and 20, and the power piston 22.

At this time, the outputted force derived from the vacuum servo unit 10 follows a line 'a' in FIG. 5.

Under the output maintaining mode of the valve mechanism 34 after the input force increases from Fi1 to a value less than Fi2, for example if the input applied to the input rod 27 and the input member 28 from the brake pedal 80 is decreased to a value above Fi1, the rear portion 272 of the input rod 27 is retracted relative to the power piston 22 by the urging force of the return spring 81 which serves to bring the brake pedal 80 to the initial position thereof.

Upon retraction of the rear portion 272, the front portion 271 is also retracted by the spring 40 relative to the power piston 22. That is, the front portion 271 and the rear portion are combined in a male-and-female connection and, as a unit which remains unchanged, is retracted relative to the power piston 22.

Upon retraction of the input rod 27, the second member 282 connected to the front member 271 of the input rod 27 is retracted relative to the power piston 22, the first member 281 is subsequently retracted by the urging force of the spring 47, and the movable core 45, which is in engagement with the first member 281, is retracted. Thus, the first member 281, the second member 282, and the movable core 45 are, as one unit, retracted.

Retraction of the input member 28 retracts the movable portion 35c of the control valve 35 relative to the power piston 22, thereby moving the negative pressure sealing portion 35b away from the negative pressure valve seat, 22b. Thus, the negative pressure valve V2 is opened, and the valve mechanism 34 is moved to the output decreasing mode.

Moving the negative pressure sealing portion 35b away from the negative pressure valve seat 22b establishes fluid communication between the vacuum passage 37 and the air passage 38 through the clearance between the negative pressure sealing portion 35b and the negative pressure valve seat 22b, and the pressures in the respective rear chambers 24 and 26 are evacuated to the vacuum source via the first front chamber 23. Thus, the pressure in each of the rear chambers 24 and 26 drops.

This brings a decrease in the prompting force of each of the movable walls 17 and 20 and the power piston 22, which causes retraction of the each of the movable walls 17 and 20, the power piston 22, and the output rod 49 relative to the power piston 22. During such movements, the power piston 22 itself also retracts, which causes movement of the negative pressure valve seat 22b toward the negative pressure sealing portion 35b, resulting in engagement therebetween. Thus, the negative pressure valve V2 is closed, which causes interruption of air movement into the first front chamber 23 from each of the rear chambers 24 and 26. The valve mechanism 34 is therefore moved to the output maintaining mode and the decrease of the prompting force of each of the movable walls 17 and 20 and the power piston 22 is interrupted or stopped.

At this time, the output derived from the vacuum servo unit 10 follows the line 'a' so long as the input ranges from Fi1 to Fi2 during normal braking operation.

When the value of the input is Fi2 in FIG. 5, the pressure in each of the rear chambers 24 and 26 becomes atmospheric pressure. If the input ranges from Fi1 to Fi2, the changing degree of the force transmitted from the output rod 49 to the master cylinder 53 is larger than that of the force applied to the input member 28. The slope of the line 'a' defined by the ratio of the input to the output coincides with the ratio of the abutting area between the rear side of the reaction disc 48 and the front side of the input member 28 to the area of the rear side of the reaction disc 48.

In FIG. 5, the graph shows that if the input is Fi2 the output becomes Fo2. When the input increases from Fi2, the resulting output increases correspondingly. It is to be noted that the change in the degree of force indicated by the unit along the y-axis is set to be larger than that indicated by the unit along the x-axis. If the units along the x-axis and the y-axis are set to be equal upon change in the degree of force, the slope of the line "a" becomes 45 degrees, subject to that the input is above Fi2.

For example, during vehicle cruising, if a sensor (not shown) detects that a between the vehicle and the vehicle in front of it becomes smaller than a set distance, the electronic control unit 50 begins to establish an automatic braking operation by initiating the actuator 41. The automatic braking operation is established by only the actuator 41 without an application of a force to the input member 28 and the input rod 27 from the brake pedal 80.

When the electronic control device 50 supplies a current whose magnitude is i1 to the solenoid coil 42, the attracting force is generated between the movable core 45 and the stationary core 44, thereby advancing the movable core 45 against the urging force of the spring 47 relative to the power piston 22. Advancement of the movable core 45 causes the first member 281, whose engaging portion 281a is in engagement with the first inward flange 45a of the movable core 45, to be advanced relative to the power piston 22 and the second member 282.

Advancement of the movable core 45 relative to the power piston 22 and the second member 282 causes the front side of the second inward flange 45b of the movable core 45 to be brought into engagement with the rear side of the first outward flange 282a of the second member 282, thereby advancing the second member 282 together with the movable core 45.

Concurrent advancements of the movable core 45 and the input member 28 advances only the front portion 271 of the input rod 27 connected to the second member 282 of the input member 28 is advanced relative to the power piston 22. The rear portion 272 of the input rod 27 fails to follow the movement of the front portion 271 because the rear portion 272 is held at its initial stage by the urging force of the return spring 81 via the brake pedal 80. That is, the movable core 45, the input member 28, and the front portion 271 of the input rod 27 are advanced against the urging forces of the springs 40 and 47.

Further concurrent movements of the movable core 45, the input member 28, and the front portion 271 establishes engagement of the front side of the input member 28 with the rear side of the reaction disc 48 and there is no clearance between the reaction disc 48 and the input member 28.

Because member 281c of the first member 281 easily deforms in the axial direction, after engagement between the reaction disc 48 and the input member 28 further advancement of the movable core 45 is possible relative to the power piston 45. Thus, such further movement of the movable core 45 axially compresses the member 281c, which causes further advancement of the second member 282.

Advancement of the movable core 45 and the second member 282 caused by the deformation of the member 281c relative to the power piston 22 is prevented when the front and of the movable core 45 is brought into engagement with the portion which surrounds the opening of the cylinder portion 281b of the first engaging portion 281a of the first member 28.

At this time, the actuator 41 generates the driving force whose magnitude is Fa1 which is equal to the input value Fi1, meaning that the input member 28 is advanced in the frontward direction by the driving force Fa1. In other words, such a condition is equivalent to the application of an input force of magnitude Fi1 to the input member 28 by the driver of the vehicle.

Advancing the input member 28, including the second member 282, causes engagement of the negative pressure seal portion 35b of the control valve 35 with the negative pressure valve seat 22b, thereby closing the negative pressure valve V2. Thus, an interruption is made between the vacuum passage 37 and the air passage 38, which isolates the second rear chamber 26 from the first front chamber 23 and results in the valve mechanism 34 assuming the output maintaining mode. Moreover, the atmospheric pressure valve seat 28a of the input member 28 moves away from the atmospheric pressure sealing portion 35a of the control valve 35, which opens the atmospheric pressure valve V1, thereby establishing the output increasing mode of the valve mechanism 34. In addition, the stationary core 44 and the movable core 45 are out of engagement with each other, thereby defining a clearance therebetween.

During the output increasing mode of the valve mechanism 34, atmospheric air flows into the rear chambers 24 and 26 via the clearance between the atmospheric pressure valve seat 28a and the atmospheric pressure sealing portion 35a and the air passage 37, which increases the pressure in each of the rear chambers 24 and 26, thereby producing the prompting force of each of the movable walls 17 and 20 and the power piston 22.

Such prompting forces are transmitted from the power piston 22 to the output rod 49 via the stationary core 45 of the actuator 45 and the reaction disc 48, which causes unitary advancement of the movable walls 17 and 20, the power piston 22, the actuator 41, the input member 28, the front member 271 of the input rod 27, and the output rod 49 relative to the housing 14, thereby activating the master cylinder 52.

During this advancement of the power piston 22 relative to the housing 14, the movable core 45 moves together with the power piston 22 because the movable core 45 is attracted to the stationary core 44 so long as the solenoid 42 is energized, and therefore the input member 28 and the front member 271 of the input rod 27 are also advanced together with the power piston 22.

Advancement of the front member 271 of the input rod 27 together with the input member 28 and the power piston 22 is made relative to the rear member 272, which holds the rear member 282 at the initial position, thereby remaining the brake pedal 80 at its initial position.

While the power piston 22 is being advanced, the reaction disc 48 is compressed and the (deformed) reaction disc 48 is extended into the guide member 46, and the reaction disc 48 transmits the prompting forces of both the power piston 22 and the input member 28 to the output rod 49 and a reaction force corresponding to the output from the output rod 49 is applied to the input member 28 for retracting the input member 28 relative to the power piston 22.

Upon experiencing the reaction force from the reaction disc 48, the first member 281 is retracted against the driving force of the actuator 41 or the attraction force between the stationary core 44 and the movable core 45, which is generated when the solenoid coil 42 is energized as described above, which retracts the second member 282 together with the movable core 45 and the first member 281 because the second member 282 is urged in the rearward direction by the spring 40.

Stated somewhat differently, unitary retraction of the movable core 45, the input member 28, and the front member 271 of the input rod 27 is performed so that engagement between the second inward flange 45b of the movable core 45 and the first outward flange 282a of the second member 282 is maintained, as well as maintaining the clearance between the first member 281 and the second member 282.

Soon after the input member 28 is retracted by the reaction force from the reaction disc 48, the atmospheric pressure sealing portion 35a of the control valve 35 re-engages with the atmospheric pressure valve seat 28a, which interrupts fluid communication between the air passage 39 and the atmosphere, thereby stopping the introduction of atmospheric pressure into each of the rear chambers 24 and 26. Thus, the valve mechanism 34 is turned to the output maintaining mode.

The output of the vacuum servo unit 10, which operates the 'jumping operation' mentioned above, normally depends on the degree or amount of extension of the reaction disc 48 upon deformation hereof. This extension degree of the reaction disc 48 when the actuator 41 is operated is smaller than the extension degree of the reaction disc 48 during normal operation under the input Fi1, and the output when the actuator 41 is operated is smaller than the output during the 'jumping operation.' That is to say, without an input from the driver, as shown in FIG. 5, the output force Fo3, which is smaller than the output force Fo1, is derived from the master cylinder 52.

When the vacuum servo unit 10 generates an output force Fo3, the piston of the master cylinder 52 is pushed, thereby supplying the brake fluid through the actuator division 54 to the wheel cylinders 55, 56, 57, and 58 of wheels FR, FL, RR, and RL, respectively. Thus, each of the wheels FR, FL, RR, and RL is supplied a braking force based on the output force Fo3 from the vacuum servo unit 10.

If, after a set time, the vacuum servo unit 10 has supplied a current of magnitude i1 and generated an output force Fo3 from solenoid 42, the electronic control 50 increases the current magnitude from i1 to i2.

The increased current generates an increase in the attraction force between the movable core 45 and the stationary core 44, the driving force generated by the actuator 41 is increased from Fa1 to Fa2 (Fa1<Fa2<Fi2), and it is no longer capable of maintaining the output maintaining mode of the valve mechanism 34 during which the reaction force from the reaction disc 48 is in balance with the driving force of the actuator 41.

That is to say, the movable core 45 is advanced relative to the power piston 22 against the urging force of the spring 47 via the first member 281 and the reaction force from the reaction disc 48, and the resultant movement of the movable core 45 causes an advance movement of the first member 281 which is in engagement with the movable core 45.

Furthermore, due to the fact that the second inward flange 45b of the movable core 45 is in engagement with the first outward flange 282a of the second member 28, the input member 28 advances together with the movable core 45 in unison relative to the power piston 22.

As a result of the unitary advancement of the movable core 45 and the input member 28, only the front member 271, engaged with the second member 282 of the input member 28, is advanced and the rear member 271 remains at its initial position without being advanced. That is to say, against the urging forces of springs 40 and 47 and the reaction force from the reaction disc 48, the movable core 45, the input member 28, and the front member 271 of the input rod 27 are, as one unit, advanced. At this time, the input member 28 is urged by the driving force of magnitude Fa2. This condition is equivalent to a condition under which the input member 28 is supplied with a force of Fa3.

Advancement of the input member 28, including the second member 282, causes movement of the atmospheric pressure valve seat 28a of the input member 28 away from the atmospheric pressure sealing portion 35a of the control valve 35, which opens the atmospheric valve V1, thereby establishing the output increasing mode of the valve mechanism 34. In addition, the stationary core 44 and the movable core 45 are out of engagement with each other, thereby defining a clearance therebetween.

In the output increasing mode of the valve mechanism 34, the atmosphere is introduced into each of the rear chambers 24 and 26 through the clearance between the seat 28a and the sealing portion 35a and the air passage 37, which causes an increase in pressure in each of the rear chambers 24 and 26, thereby producing the prompting forces of the respective the movable walls 17 and 20 and the power piston 22.

The prompting forces of the movable walls 17 and 20 and the power piston 22 are transmitted from the power piston 22 to the output rod 49 via the stationary core 45 of the actuator 41 and the stationary disc 48, and unitary movement of the movable walls 17 and 20, the power piston 22, the actuator 41, the input member 28, the front member 271 of the input rod 27, and the output rod 49 is effected relative to the housing 14, thereby initiating operation of the master cylinder 52.

Because of the attraction force between the movable core 45 and the stationary core 44 while the solenoid 42 is energized, the movable core 45 advances together with the power piston 22 relative to the housing 14, thereby advancing the input member 28 and the front member 271 of the input rod 27 together with the power piston 22.

Advancement of the front member 271 of the input rod 27 relative to the rear member 272, which is together with the power piston 22, maintains the rear member 272 at its initial position, thereby holding the brake pedal 80 at its initial position.

During advancement of the power piston 22 relative to the housing 14, the reaction disc 48 is compressed by the power piston 22 and the output rod 49, and the reaction disc 48 is extended into the guide member 46. The reaction disc 48 transmits the prompting forces of the power piston 22 and the input member 28 and supplies a reaction force corresponding to the output of the output rod 49 to the input member 28, which retracts relative to the power piston 22.

Retraction of the first member 281 of the input member 28 by experiencing the reaction force from the reaction disc 48 is occurs against the driving force of the actuator 41 (which is the attraction force between the stationary core 44 and the movable core 45 when the solenoid 42 is energized), and the second member 282 is retracted, together with the movable core 45 and the first member 281, due to the fact that the second member 282 is urged in the rearward direction by the spring 40 via the front member 271.

That is to say, the movable core 45, the input member 28, and the front member 271 are, in unison, retracted in such a manner that the engagement between the second inward flange 45b of the movable core 45 and the first outward flange 282a of the second member 282 is maintained, as well as the clearance between the first member 281 and the second member 282.

Soon after the input member 28 is retracted by the force from the reaction disc 48 relative to the power piston 22, the atmospheric pressure sealing portion 35a of the control valve 35 re-engages the atmospheric pressure valve seat 28a, which interrupts fluid-communication between the air passage 39 and the atmosphere, thereby stopping the introduction of the atmospheric pressure into each of the rear chambers 24 and 26. Thus, the valve mechanism 34 is switched to the output maintaining mode.

When the electronic control device 50 turns on the actuator 41 by applying a current of magnitude i2, the resultant driving force from the actuator 41 is Fa2, which is not less than Fa1 and which is not greater than the input Fi2 (Fa1<Fa2<Fi2). This is identical to a condition which generates an output Fo4 when an input Fa2 is applied by the driver according to the line 'c' (see FIG. 5) which causes a jumping output Fo3 when the input is Fi1. This means that the vacuum servo unit 10 supplies an output or force of magnitude Fo4 to the master cylinder 52 for initiation thereof. That is to say, the output Fo4 is derived without the input from the driver.

Upon receipt of the force Fo4 from the vacuum servo unit 10, the master cylinder 52 is initiated in such a manner that the piston is moved and the brake fluid under pressure is fed via the actuator division 54 to each of the wheel cylinders 55, 56, 57, and 58 for wheels FR, FL, RR, and RL. Thus, wheels FR, FL, RR, and RL are supplied with the braking force depending on the output Fo4 from the vacuum servo unit 10.

In other words, adjusting the amount of the current to be supplied to the solenoid coil 42 on which the driving force of the actuator 41 depends establishes a control of the output of the vacuum servo unit 10.

While the vacuum servo unit 10 is in automatic braking mode for inter-vehicle distance control, stepwise increase of the output from Fo3 to Fo4 realizes a smooth increase of the braking force.

If a condition for deenergizing the solenoid 42 is satisfied, for example, the sensor recognizes that the inter-vehicle distance has returned to or is above a set value, the electronic control device 50 deenergizes the solenoid 42 based on the output of the sensor.

Thus, the driving force Fa2, which acts on the input member 28 from the actuator 41, is removed, which results in return of the movable core 45 and the first member 281 to their respective initial positions by the spring 47, and the second member 282 and the front member 271 of the input rod 27 are retracted relative to the power piston 22 by the spring 40 and are returned to their respective initial positions.

Retraction of the input member 28 causes retraction of the movable portion 35c of the control valve 35 relative to the power piston 22, which moves the negative pressure valve sealing portion 35b away from the negative pressure valve seat 22b, thereby opening the negative pressure valve V2. Thus, the valve mechanism 34 is switched to the output decreasing mode.

When the valve seat 22b is separated from the sealing portion 35b, the vacuum passage 37 is brought into fluid communication with the air passage 38 through the clearance between the valve seat 22b and the sealing portion 35b, and the pressures in the rear chambers 24 and 26 drop due to the fact that the rear chambers 24 and 26 are connected to the vacuum source via the first front chamber 23.

Therefore, the respective pressure differences between the front chambers 23, 25 and the rear chambers 24, 26 are decreased, which, with the expanding force of the spring 51, causes retraction of the movable walls 17 and 20 and power piston 22 to their respective initial positions. Subsequently, the input member 28 and the front member 271 of the input rod 27 are also returned to the respective initial positions. Thus, the inter-vehicle distance control of the vacuum servo-unit 10 is terminated.

Upon such a return movement of the front member 271 of the input rod 27, the aperture 271c discharges the compressed air in the blind bore 271b into the power piston 22, thereby smoothly changing modes of the valve mechanism 34. For example, while the vacuum servo unit 10 is in the automatic operation mode under which the output Fo4 from the vacuum servo unit is derived by applying a current i2 to the solenoid 42, when the driver depresses the brake pedal 80, the rear member 272 of the input rod 27 is advanced relative to the front member 271 thereof. At this time, the air in the blind bore 271b in the front member 271 is compressed by the convex portion 272a of the rear member 272 under advancing and the resultant air is discharged via the aperture 271c into the power piston 22. This air discharge, or air exclusion, establishes an adequate dampening effect thereby giving a comfortable brake feeling to the driver.

While the vacuum servo unit 10 is in the automatic operation mode, if the brake pedal 80 is depressed, the resultant rotation thereof about the axis or pivot 801 causes a downward (in FIG. 2) force which is applied to the rear member 272. However, setting the axial (lengthwise) engagement of the engaging portion 273 between the convex portion 272a of the rear member 272 and the blind bore 271c in the front member 271 in sufficient to enable smooth movement of the rear member 272 in the blind bore 271c.

For further smooth movement of the rear member 272 in the blind bore 271c, a lubrication material may be used, such as a grease or an oil. Even though the lubrication material may drop down from the engaging portion 273, the lubrication material fails to fall near the driver's foot, and therefore the driver's foot does not become dirty. The reason is that the dropped lubrication material is confined in the power piston 22 and the position of the engaging portion 273 is isolated from near the driver's foot.

It is also to be noted that droppings of lubrication material within the power piston 22 fail to leak outside the piston through the opening 22a, because the sound-absorbing member 31, the filter 30, and the cover member 29 act as a barrier.

In addition, the engaged portion 273 of the input rod 27 is located within the power piston 22 whose inner space is in fluid communication with the outside via the sound-absorbing member 31, the filter 30, and the cover member 29, which assists in minimizing adherence of dust to the engaging portion 273, thereby further ensuring the smooth relative movement between the front member 271 and the rear member 272. That is to say, the sound-absorbing member 31, the filter 30, and the cover member 29 act as one embodiment of a restriction means for preventing invasion of dust or mud into the power piston 22.

While the vacuum servo unit 10 is in the automatic operation mode, excess advancement of the power piston 22 relative to the housing 14 may sometimes cause groove 272d of the rear member 272 of the input rod 27 to be in opposition to the projection 271d of the front member 271. In such a situation, the projection 271d engages the groove 272d after sliding through the aperture 271f. The resulting engagement of projection 271d and groove 272d prevents further advancement of the front member 271 relative to the rear member 272. Thus, the front member 271 is prevented from being extracted or removed from the rear member 272.

In addition, the groove 272d includes tapered wall 272da, which facilitates an easy extraction of the projection 271d from the groove 272d when the front member 271 is retracted relative to the rear member 272, thereby ensuring easy retraction of the front member 271 relative to the rear member 272 and any subsequent mode change of the valve mechanism 34.

As explained in greater detail above, in accordance with the first embodiment of the vacuum servo unit 10, wherein the front member 271 of the input rod 27 is advanced relative to the rear member 272 thereof, positioning the engaging portion 273, at which the front member 271 is in engagement with the rear member 272 within the power piston 22, enables prevention of dropping the lubrication material down near the driver's foot. Additionally, positioning the engaging portion 273 in the power piston 22 enables miniaturization of the vacuum servo unit 10 in the axial direction, which further enables simple installation or mounting the unit 10 on the vehicle body.

Figure 6:
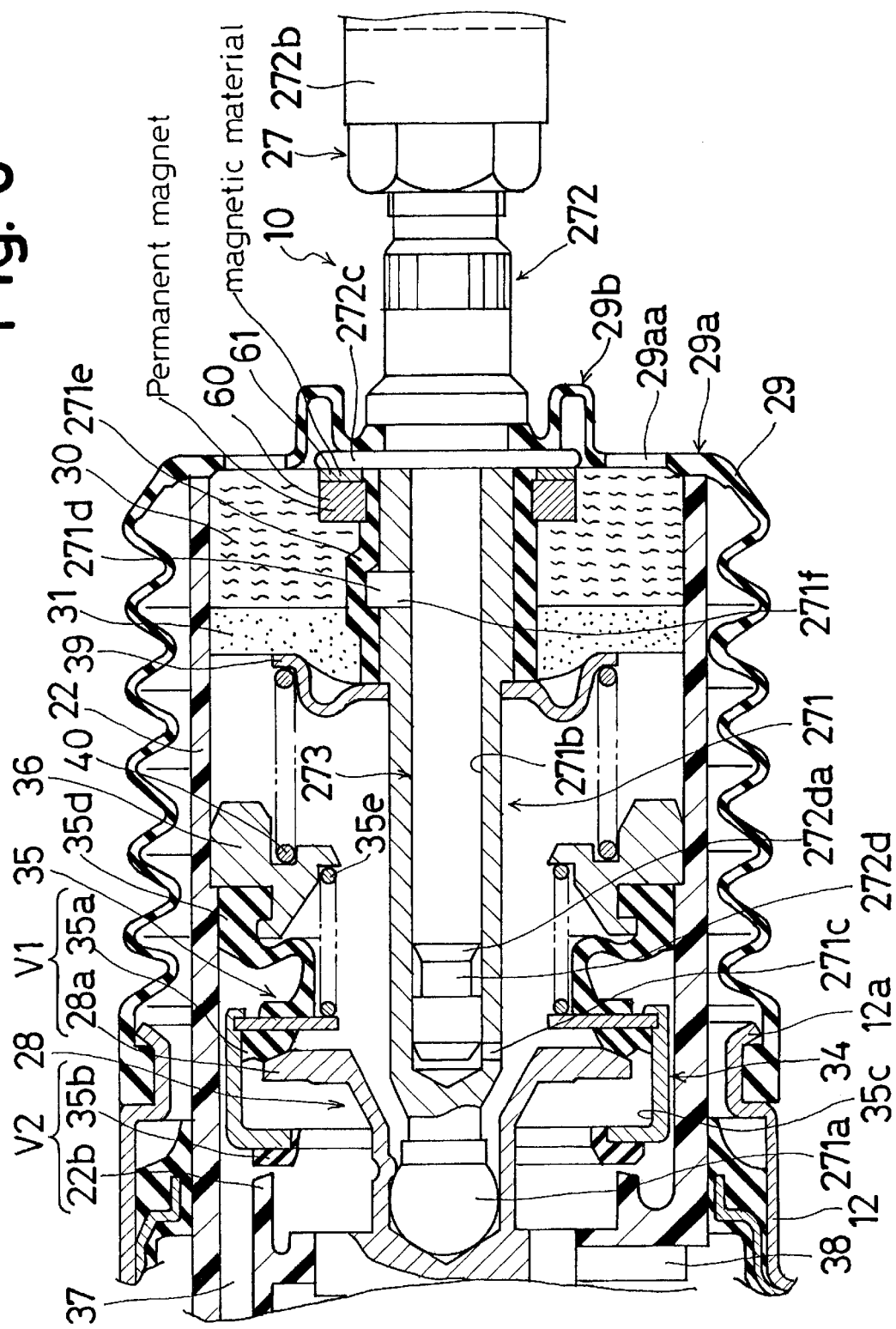
FIG. 6 illustrates an enlarged cross-sectional view of a valve mechanism of a second embodiment of a vacuum servo unit in accordance with the present invention.

Referring next to FIG. 6, a second embodiment of the vacuum servo unit 10 in accordance with the present invention is illustrated which is substantially similar to the first embodiment, except that the detailed structure of the input rod 27 of the second embodiment is different from that of the first embodiment.

The front member 271 of the input rod 27 is fixedly mounted on the input rod with a ring-shaped permanent magnet 60. A front side of the stepped portion 272c of the rear member 272 is secured with a ring member 61 formed of a magnetic material.

In the condition illustrated in FIG. 6, which coincides with the initial stage of the vacuum servo unit 10, the ring member 61 is attracted by the permanent magnet 60, thereby coupling or integrating the first member 271 and the rear portion 272. This connection enables connection of the input rod 27 to the brake pedal 80 when the vacuum servo unit 10 is assembled to the vehicle body in such a manner that the valve mechanism 34 remains at its output decreasing mode.

No additional detailed explanations of other portions of the second embodiment are included herein, as one of ordinary skill will readily appreciate the remaining features thereof by comparison with the first embodiment of the present invention, described in greater detail above and illustrated in FIGS. 1–5.

It is to be noted that of course a mutual exchange between is possible between the permanent magnet 60 and the ring member 61 and such an exchange also offers the same operation and effects as mentioned above.

Figure 7:
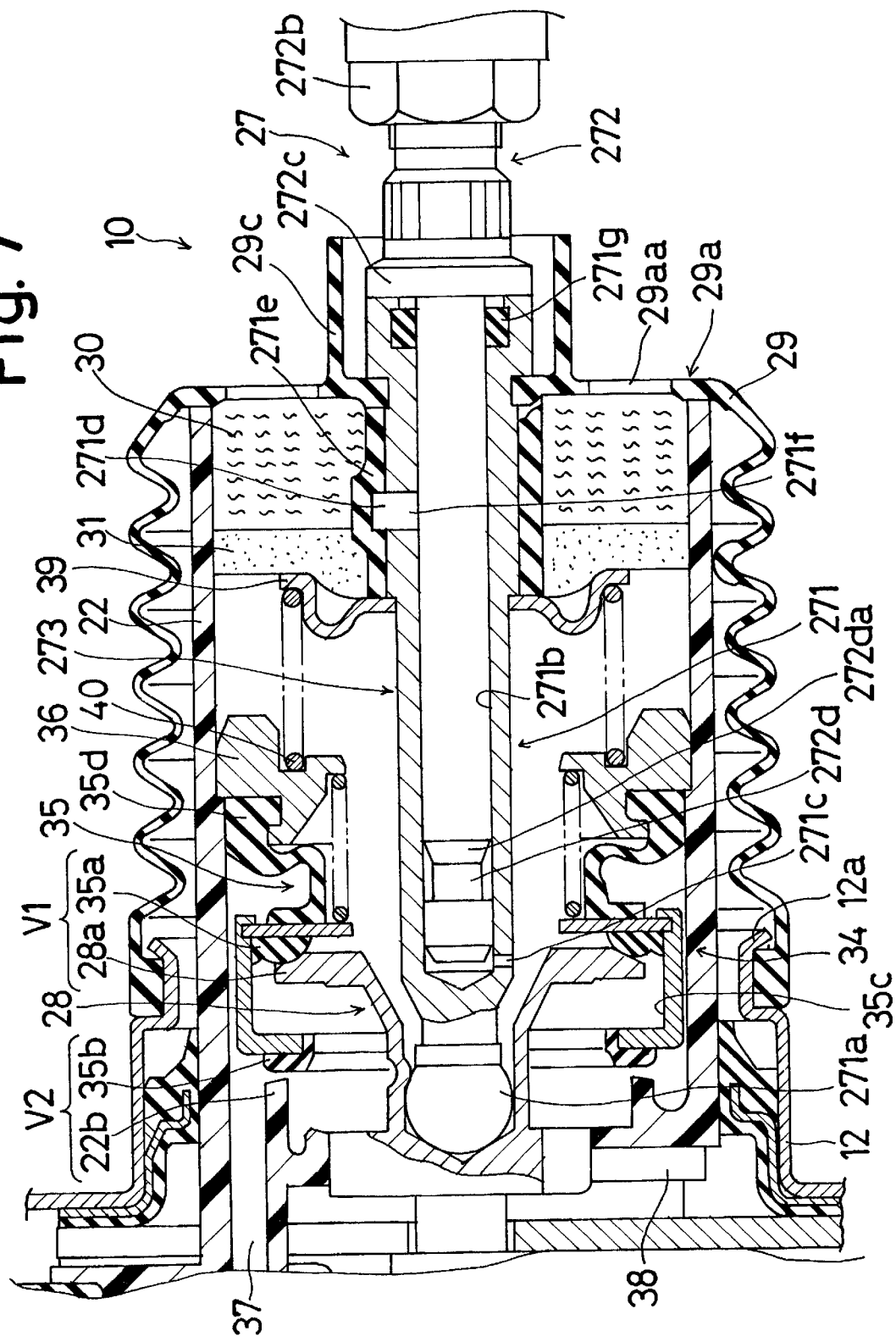
FIG. 7 illustrates an enlarged cross-sectional view of a valve mechanism of a third embodiment of a vacuum servo unit in accordance with the present invention.

Referring next to FIG. 7, a third embodiment of the vacuum servo unit 10 in accordance with the present invention is illustrated which is substantially similar to the first embodiment, except that the detailed structure of the input rod 27 and the cover member 29 of the third embodiment are different from those of the first embodiment.

The annular portion 29a of the cover member 29 is fitted and coupled to the outer periphery of the rear portion 272b of the rear member 272, which extends rearwardly through the rear opening of the power piston 22.

The cover member 29 includes a cylindrical rearward extension 29c. The rearward extension 29c covers the outer surface of the rear portion 272c, especially the portion at which engagement is established between the outer periphery of the opening of the blind bore 271b in the front member 271 and the stepped portion 272c of the rear member 272.

A seal ring 271g is fitted in the inner surface of the blind bore 271c of the front member 271 so as to be near the rear opening thereof, and acts as a restricting member. The seal ring 271g is positioned between the blind bore 271c of the front member 271 and the convex portion 272a of the rear member 272.

Thus, the axial extension 29c of the cover member 29 and the seal ring 271g prevent the invasion of dust or mud into the engaging portion 273 of the input rod 27 and, even though lubrication material may be used, help prevent the possibility of the lubrication material flowing from the engaging portion along the input rod 27 and subsequent dropping from the unit 10 may be prevented by members 29c and 271g.

Figure 8:
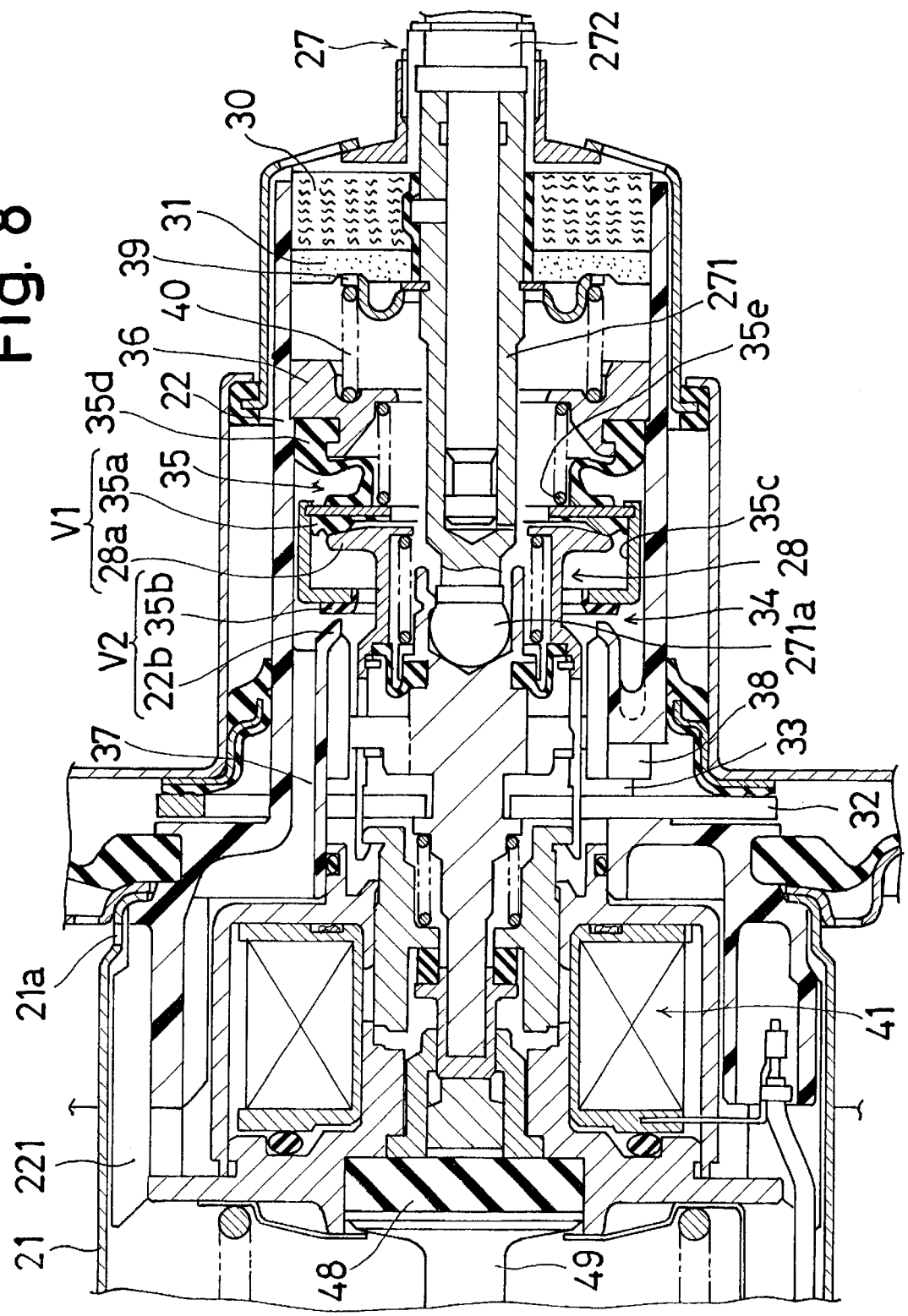
FIG. 8 illustrates an enlarged cross-sectional view of a valve mechanism of a fourth embodiment of a vacuum servo unit in accordance with the present invention.
Figure 9:
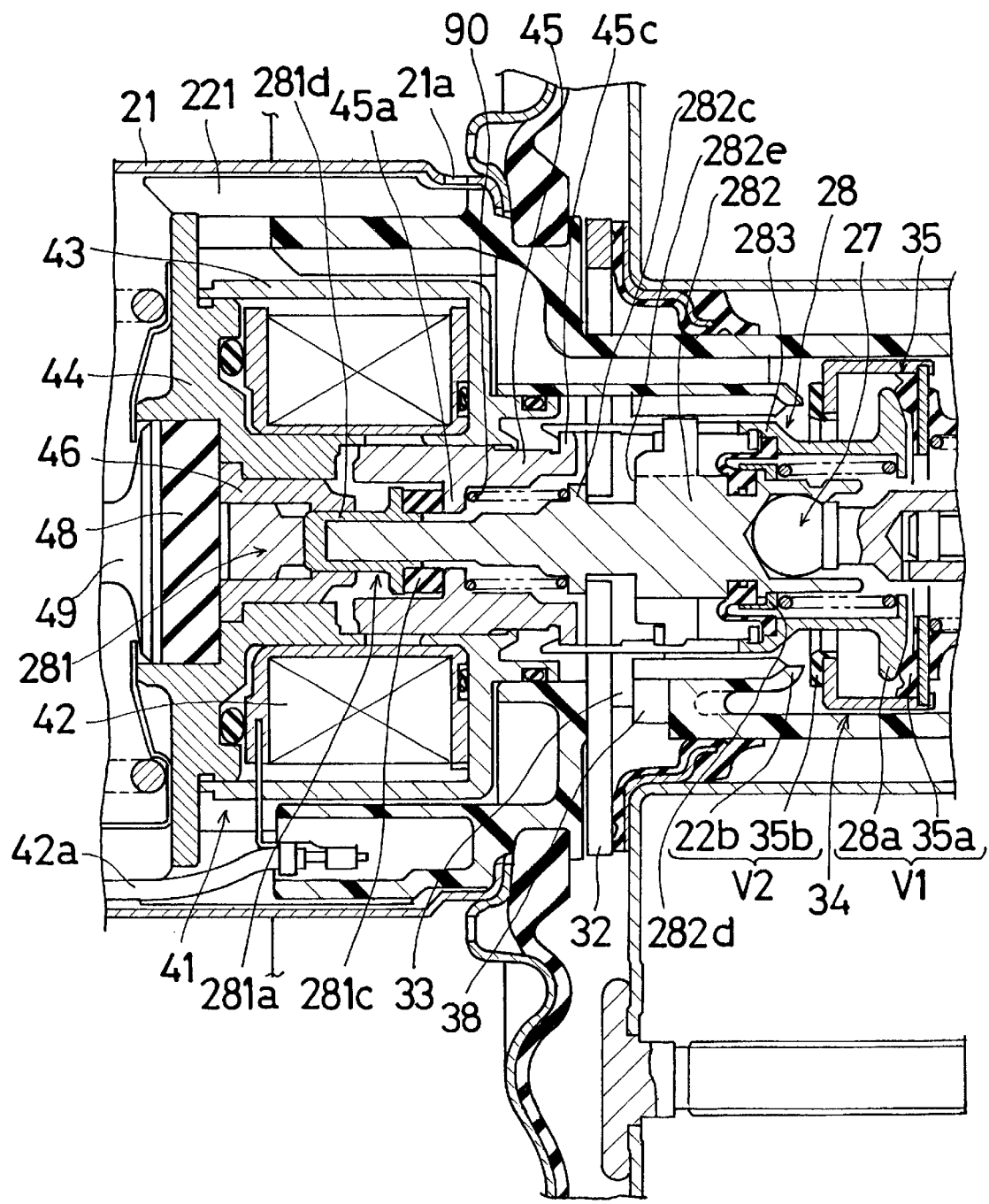
FIG. 9 illustrates an enlarged cross-sectional view of an actuator of the vacuum servo unit shown in FIG. 8.
Figure 10:
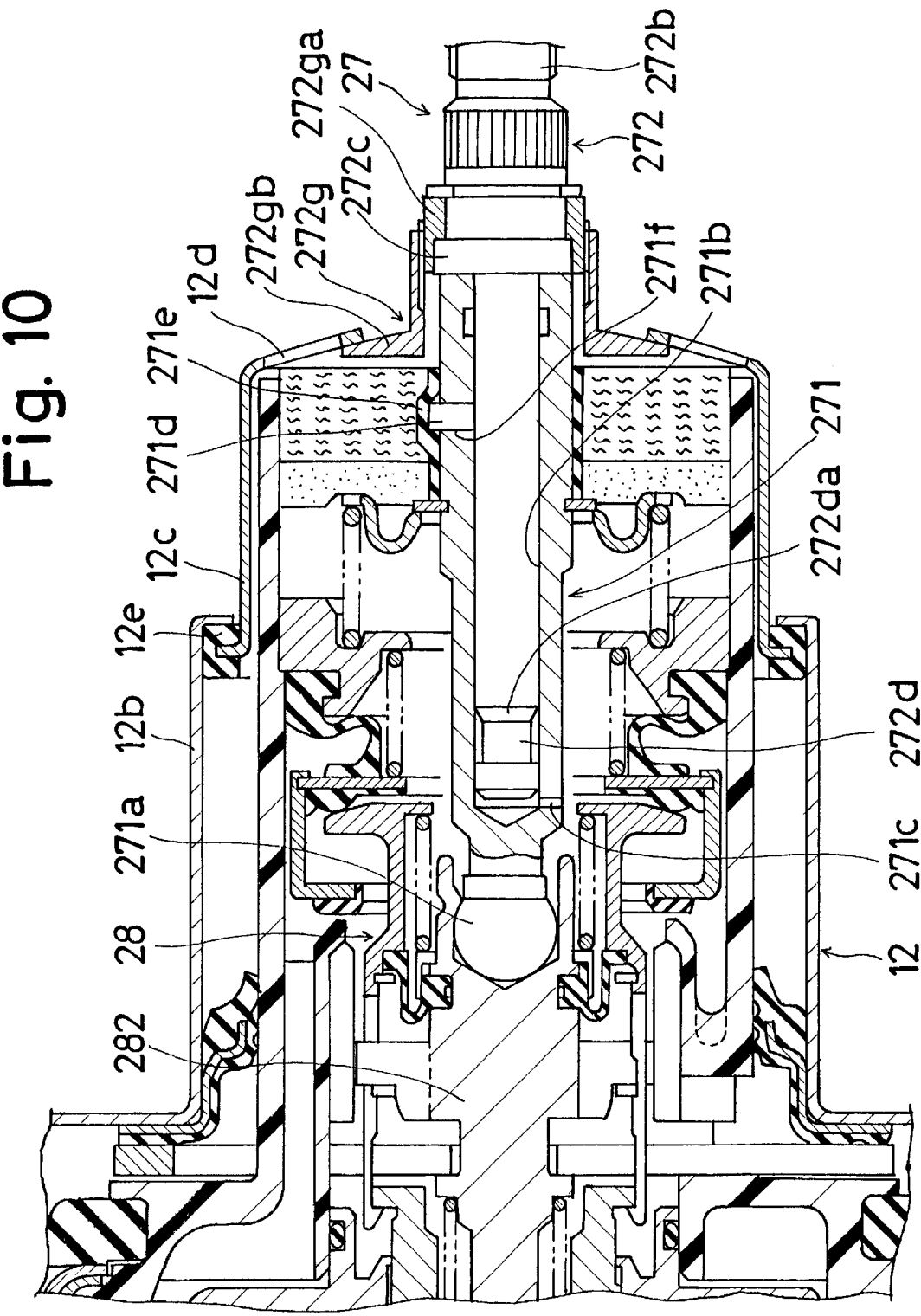
FIG. 10 illustrates an enlarged cross-sectional view of a vicinity of an input rod of the vacuum servo unit illustrated in FIG. 8.

Referring to FIGS. 8 through 10, a fourth exemplary embodiment of the vacuum servo unit 10 in accordance with the present invention is illustrated. The valve mechanism 34, the actuator 41, and the input rod 27 of the fourth embodiment are different from those of the first embodiment. Hereinafter, however, the elements common to both the first and fourth embodiments will not be further explained, and an appreciation of these elements can be gained from the foregoing description thereof.

As illustrated in FIGS. 8 through 10, the input member 28 is positioned at a front side (left side in FIGS. 8 and 9) in the power piston 22. The input member 28 has a first member 281 which is in abutment with the reaction disc 48, a second member 282 positioned at a rearward of the first member 281 so as to be in alignment therewith and connected to the input rod 27, and a cylindrical third member 283 positioned outside of the second member 282 and having an atmospheric pressure valve seat 28a.

The first member 281 has at its rear end a rearwardly open blind bore 281d in which a front portion of the second member 282 is slidably fitted. Thus, the first member 281 is movable back and forth relative to the second member 282. Under the initial state shown in FIG. 9, the bottom of the blind bore 281d of the first member 281 is in engagement with the front end of the second member 282.

The third member 283 is positioned around the second member 282 so as to be coaxial therewith and is movable relative thereto. Between the inner surface of the third member 283 and the outer surface of the second member 282, there is provided a diaphragm for establishing a seal therebetween.

The valve mechanism 34 includes the atmospheric pressure valve seat 28a, the negative pressure valve seat 22b, and the control valve 35. The atmospheric pressure valve seat 28a is in the form of a ring, formed integrally with the third member 283, and is oriented in the rearward direction (rightward direction in FIG. 8). The negative pressure valve seat 22b is formed integrally with the power piston 22 and is oriented in the rearward direction. The control valve 35 has a ring-shaped atmospheric pressure sealing portion 35a which is in opposition to the atmospheric pressure valve seat 28a so as to be engaged and disengaged therewith, and a ring shaped negative pressure sealing portion 35b which is in opposition to the negative pressure valve seat 22b so as to be engaged and disengaged therewith.

At a frontward portion of an inner space of the power piston 22, there is provided an actuator 41 which includes a solenoid coil 42, a yoke 43 formed of a magnetic material, a stationary core 44 formed of a magnetic material, and a movable core 45 formed of a magnetic material.

The movable core 45 is positioned at a frontward side (leftward side in FIG. 9), is positioned around both the rear side of the first member 281 and the front side of the second member 282, and is axially movable (horizontal direction in FIG. 9) relative to both the power piston 22 and the input member 28. The movable core 45 is substantially cylindrical and includes an inward flange 45a and an outward flange 45b formed at its intermediate and rear end portions, respectively.

The first member 281 has an engaging portion 281a which is in engagement with the inward flange 45a of the movable core 45. The engaging portion 281a has an outer flange extending outwardly from the opening of the blind bore 281d and a ring-shaped rubber member 281c secured to the rear side of the outer flange. The third member 283 is engaged at its front portion 283a with the outward flange 45b of the movable core 45 (see FIG. 10).

The second member 282 has at its mid portion an outward flange 282c extending outwardly therefrom. Between the outward flange 282c and the inward flange 45a of the movable core 45, there is interposed a spring 90 which urges the movable core 45 in the frontward direction.

A spring 91 is interposed between a retainer 282d supporting a diaphragm of the third member 283 and an inward flange 283b of the third member 283, thereby urging the third member 283 in the rearward direction. The urging force of the spring 91 is set to be not greater than that of the spring 90.

Thus, the movable core 45 is movable back and forth together with the power piston 22. The guide member 46 supports axial or back-and-forth movement of the first member 281 in a slidable manner.

So long as the solenoid coil 42 is not energized, which causes a non-operated condition of the actuator 41, a clearance is defined between the front end of the movable core 45 and the rear end of the stationary core 44.

Upon energization of the solenoid coil 42, which actuates the actuator 41, an electromagnetic attraction force is generated between the cores 44 and 45, thereby moving the movable core 45 in the frontward direction. The maximum stroke of the movable core 45 corresponds to the distance between the stationary core 44 and the movable core 45 in FIG. 9.

In the initial state, a clearance is defined between the rear end of the reaction disc 48 and the front end of the first member 281. An engaging portion 272g is provided at a rear portion of the convex portion 272a of the rear member 272. The engaging portion $^{272}g$ has a nut portion 272ga to be threaded into the rear member 272 and an engaging part 272gb secured to the nut portion 272ga. The engaging part 272gb includes an axial tube and an outwardly flange formed at a front end thereof.

The front shell 12 of the housing 14 includes a cylindrical portion 12b covering or surrounding the power piston 22 and a cylindrical hooked portion 12c movable in the cylindrical portion 12b. The cylindrical hooked portion 12c is provided at its rear end with an inwardly extending flange 12d which includes apertures therethrough, and at is front end, an outward flange 12e with a rubber member. The inward flange 12d engages the outer flange of the engaging part 272gb, while the outward flange 12e engages a rear, inward flange of the cylindrical portion 12b.

Engaging the inward flange 12d of the cylindrical portion 12c with the engaging part 272gb regulates retraction of the hooked portion 12c relative to the cylindrical portion 12b. Under the initial stage shown in FIG. 10, the engaging portion 272g is in engagement with the inward flange 12d of the hooked portion 12c, while the outward flange 12e of the hooked portion 12c is in engagement with the inward flange of the cylindrical portion 12b, which regulates the retraction of the rear member 272 relative to the housing 14 or the power piston 22 and the front member 271. That is to say, engagement between the engaging portion 272g and the hooked portion 12c determines the initial positions of the front member 271 and the rear member 272 of the input rod 27.

The engaging portion 272g is axially movable relative to the rear member 272 by rotating the nut 272ga. Thus, adjusting the axial position of the engaging portion 272g ensures engagement of the flange portion 272c of the rear member 272 with the portion around the opening of the blind bore 271b of the front member 271.

The outward flange 12e with the rubber member ensures the fluid-tight, sliding relationship between the cylindrical portion 12b and the hooked portion 12c.

Engagement of the engaging portion 272g and the inward flange 12d of the hooked portion 12c is achieved by engagement of mating curved-face surfaces on the two members in a curved-face to curved-face contact manner, with the center of curvature being at the center point of the ball joint 271a of the input rod 271.

The input rod 271 can swivel relative to the input member 28 due to the fact that the input rod 271 is, at the center point of the ball joint 271a, in contact with the input member 28. Together with the swivel movement of the input rod 271, the engaging portion 272g can swivel and such a swivel movement of the engaging portion 272g can occur smoothly because of the curved-face to curved-face contact between the engaging portion 272g and the inward flange 12d of the hooked portion 12c.

In the initial state, the rear end of the power piston 22 engages the inward flange 12d of the hooked portion 12c. The apertures of the inward flange 12d establish fluid communication between the atmosphere and the inside of the power piston 22.

The operation of the embodiment illustrated in FIGS. 8–10 is, in principle, substantially similar to that of the first embodiment. Normally, when the driver depresses the brake pedal, the input rod 27 is advanced relative to the power piston 22, and as the input rod 27 advances, the input member 28 advances, which switches the valve mechanism 34 to the output increasing mode, thereby causing the vacuum servo unit 10 to boost the driver's braking force.

In the course of depression of the brake pedal, if the brake pedal itself or the input rod 27 abuts with the hooked portion 12c, the hooked portion 12c is advanced relative to the cylindrical portion 12b, thereby not disturbing or preventing the depression of the brake pedal.

When in the automatic brake operation mode, if an electromagnetic attraction force is generated between the stationary core 44 and the movable core 45 upon energization of the solenoid coil 42, the movable core 45 and the third member 283 are advanced against the urging force of the spring 91 relative to the power piston 22 and the second member 282. As a result of the movements of the movable core 45 and the third member 283, the first member 281, which is operatively connected to the inward flange 45a of the movable core 45 via the engaging portion 281a, is also advanced relative to the power piston 22 and the second member 282.

Advancement of the first member 281 caused by the advancing movements of the movable core 45 and the third member 283 causes the front end of the first member 281 to be brought into engagement with the rear end of the reaction disc 48, thereby eliminating the clearance therebetween.

The rubber member 281c of the first member 281 can be axially deformed, which enables advance movements of the movable core 45 and the third member 283 even after engagement of the first member 281 with the reaction disc 48. Thus, further advancements of the movable core 45 and the third member 283 can be achieved by compressing the rubber member 281c of the first member 281.

Forward movement of the third member 283 engages the negative pressure valve sealing portion 35b of the control valve with the negative pressure valve seat 22b, which causes closure of the negative pressure valve V2. Then, fluid communication between the vacuum passage 37 and the air passage 38 is interrupted, thereby switching to the output maintaining mode of the valve mechanism 34. Furthermore, the atmospheric pressure valve seat 28a of the input member 28 is moved away from the sealing portion 35a of the control valve 35, which causes closure of the atmospheric valve V1, thereby switching to the output increasing mode.

Upon establishment of the output increase mode of the valve mechanism 34, the atmosphere is introduced into the rear chambers 24 and 26 via the clearance between the valve seat 28a and the sealing portion 35a and the air passage 38, which increases the pressures in the rear chambers 24 and 26, thereby generating forces for advancing the movable walls 17 and 20 and the power piston 22, respectively. These forces are transmitted to the output rod 49 via the power piston 22, the stationary core 44 of the actuator 41, and the reaction disc 48, which causes concurrent movements of the power piston 22, the movable walls 17 and 20, the actuator 41, the first member 281, the third member 283, the output rod 49 relative to the housing 14, thereby initiating the operation of the master cylinder.

As a result, the key member 32 is brought into engagement with the portion around the aperture 33. Because the key member 32 is in engagement with the front flange 282c of the second member 282, the second member 281 and the input rod 27 are advanced together with the power piston 22.

As apparent from the foregoing explanations, in the vacuum servo unit 10 according to this embodiment, the engaging portion 272g and the hooked portion 12c maintain the initial state of each of the front member 271 of the input rod 27 and the rear member 272 thereof, which enables an installation of the vacuum servo booster 10 in such a manner that the connection between the brake pedal and the input rod 27 can be made while the initial state of the valve mechanism 34 is maintained in the output decreasing mode.

Moreover, the spherical sliding engagement between the engaging portion 272g and the hooked portion 12c does not disturb or prevent the swivel movement of the input rod 27, thereby ensuring smooth operation of not only the input rod 27 but of the brake pedal as well. In addition, axial movement of the hooked portion 12c relative to the housing 14 assures smooth depression of the brake pedal. Furthermore, the engaging portion 272g is axially movable back and forth relative to the rear portion 272, which enables adjustment of the initial positional relationship between the front portion 271 and the rear portion 272 of the input rod 27. Moreover, the engaging portion 272g is threadely mounted on the rear portion 272, which enables easy axial movement of the engaging portion 272g by rotation thereof relative to the rear member 272.

Figure 11:
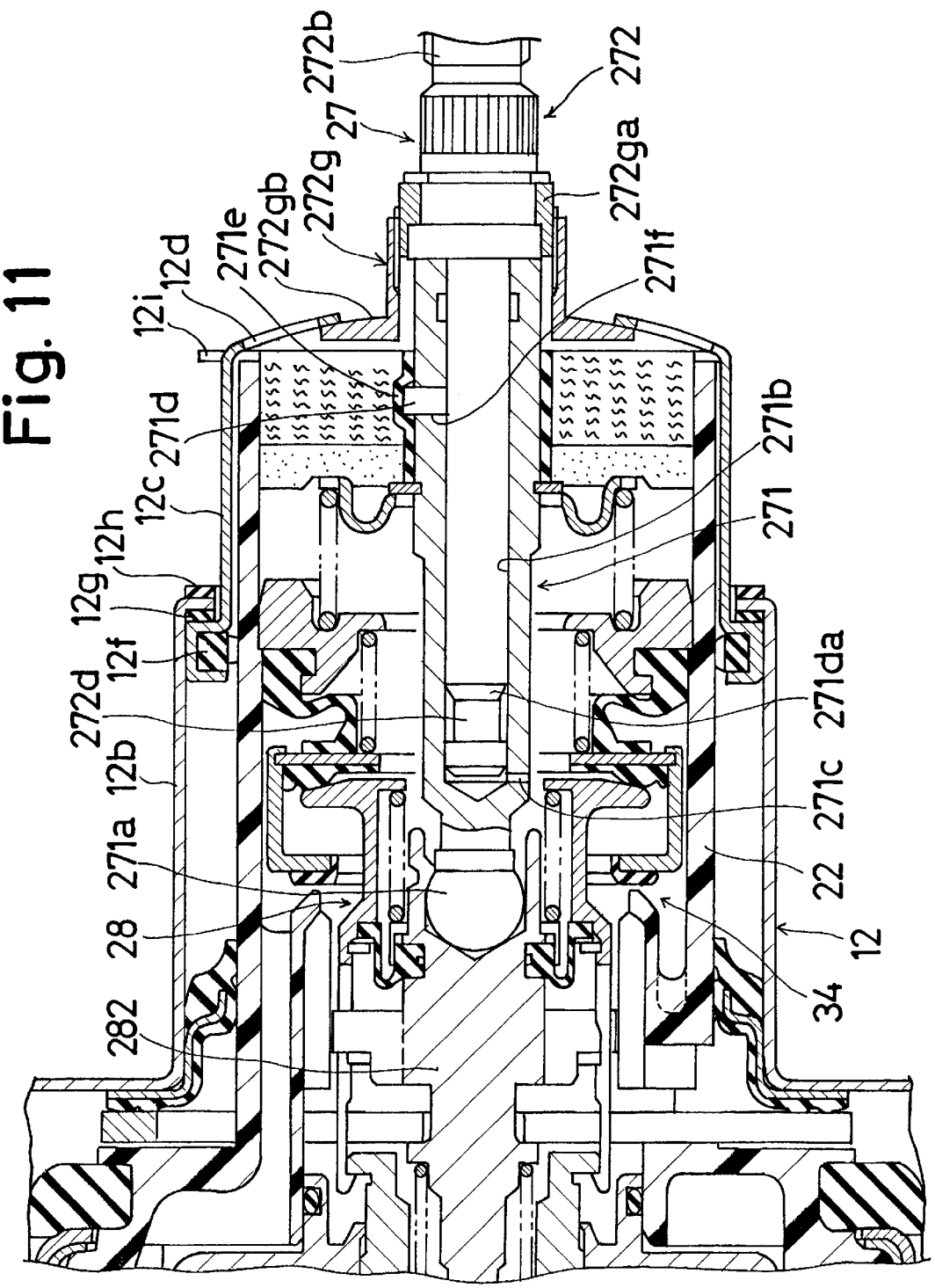
FIG. 11 illustrates an enlarged cross-sectional view of a vicinity of an input rod of a fifth embodiment of a vacuum servo unit in accordance with the present invention.

Referring to FIG. 11, there is illustrated a fifth embodiment of a vacuum servo unit 10 in accordance with the present invention. The fifth embodiment is substantially similar to the fourth embodiment, described above, except for the detailed structure of the hooked portion 12c, and therefore a detailed explanation related to the remaining portions have been omitted for purposes of brevity. The same reference numerals designate the same or similar elements as the fourth embodiment.

As illustrated in FIG. 11, the hooked portion 12c is provided with a seal member 12f for establishing a fluid tight sliding contact between the hooked portion 12c and the outer surface of the power piston 22. On opposite sides of the inward flange of the cylindrical portion 12b there are provided seal members 12g and 12h.

Retraction of the hooked portion 12c relative to the housing 14 is restricted when the outward flange of the hooked portion is brought into engagement with the seal member 12g secured to the rear housing 12b. Forward movement of the hooked portion 12c relative to the housing 14 is restricted when an outward flange 12i of portion 12c, which is at the rear side of the hooked portion 12c, is brought into engagement with the seal member 12h secured to the rear housing 12b.

During normal operation, depressing the brake pedal switches to the output increase mode of the valve mechanism 34, thereby advancing the power piston 22. As a result, a frictional force is generated by the seal member 12f by movement between the hooked portion 12c and the power piston 22, thereby advancing the hooked portion 12c together with the power piston 22. Such unitary movement of the hooked portion 12c and the power piston 22 prevents engagement of the hooked portion 12c with the brake pedal itself or the portion at which the brake pedal and the input rod 27 are connected, thereby allowing brake pedal depression.

When the outward flange 12i is brought into engagement with the inward flange of the cylindrical portion 12b, the resultant shock and noise are absorbed by the seal member 12h.

When the brake pedal is released, the power piston 22 and the hooked portion 12c retract toward their respective initial positions, which causes engagement of the outward flange of the hooked portion 12c with the inward flange of the cylindrical portion 12b. Upon such engagement, the resultant shock and noise are absorbed by the rubber member 12g.

During automatic braking mode, the advance movement of the power piston 22 attempts to establish a concurrent movement thereof with the hooked portion 12c. Because the hooked portion 12c is in engagement with the engaging portion 272g, to which is applied the urging force of the return spring for urging the brake pedal to its initial position, the initial state of the hooked portion 12c remains unchanged.

The friction force between the power piston 22 and the hooked portion 12c is less than the urging force of the return spring for urging the brake pedal to its initial position, which allows the hooked portion 12c not to follow the power piston 22 under advance movement, thereby maintaining unchanged the initial state of the hooked portion 12c.

As mentioned above, according to the vacuum servo unit 10 of the fifth embodiment, when the power piston 22 advances during normal braking operation, the hooked portion 12c moves together therewith, thereby establishing smooth brake pedal depression. In addition, when the hooked portion 12c during movement is brought into engagement with the cylindrical portion 12b, the resulting noise and the shock are absorbed by either the seal member 12g or 12h, thereby improving durability and silence of the device. Other features of the fifth embodiment are identical or substantially similar to those of the fourth embodiment and therefore are not described in further detail herein.

Figure 12:
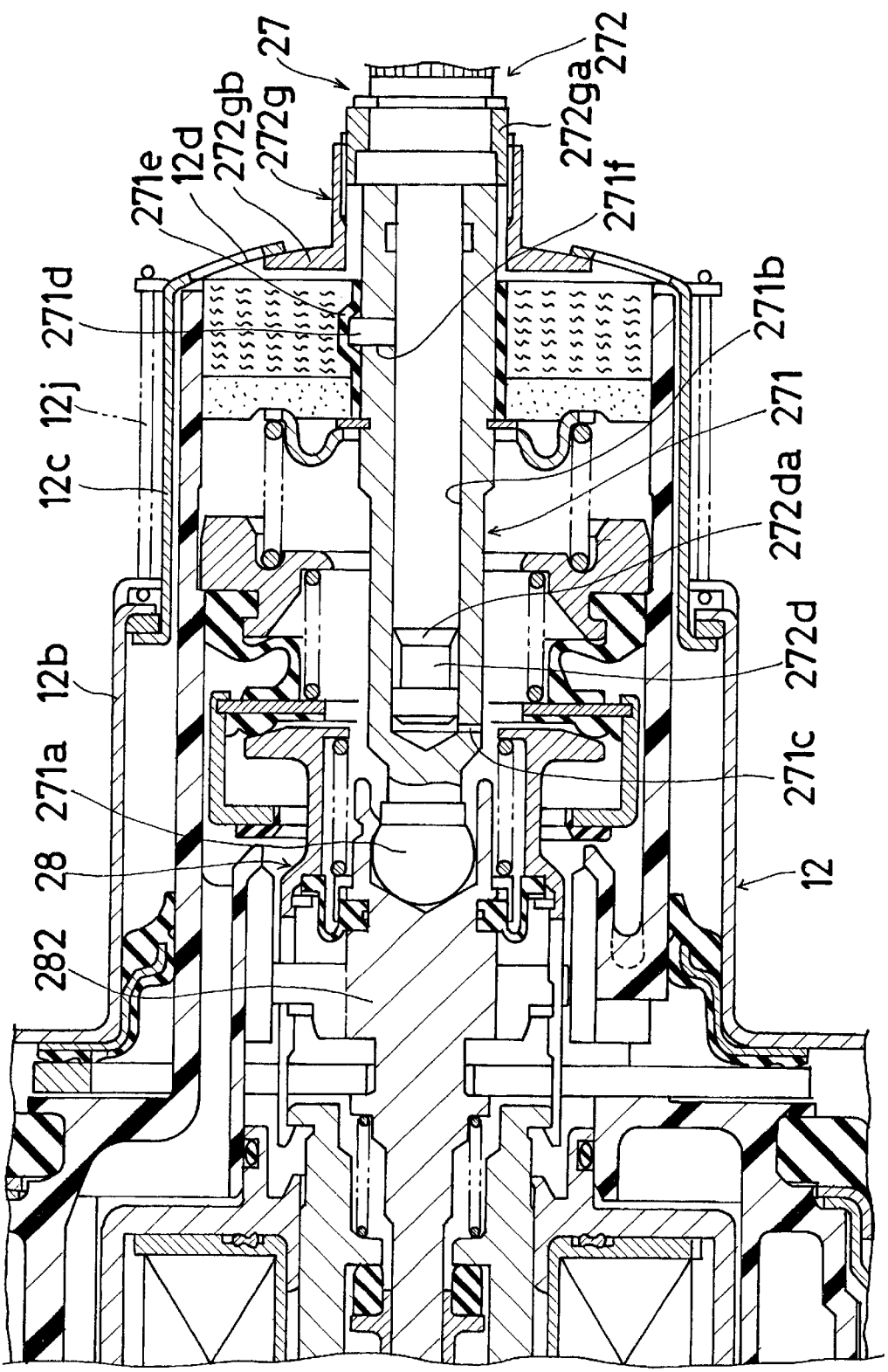
FIG. 12 illustrates an enlarged cross-sectional view of a vicinity of an input rod of a sixth embodiment of a vacuum servo unit in accordance with the present invention.

Referring to FIG. 12, there is illustrated a sixth embodiment of a vacuum servo unit 10 in accordance with the present invention. The sixth embodiment is identical or substantially similar to the fourth embodiment herein, except for the detailed structure of the hooked portion 12c, and therefore a detailed explanation of the remaining portions has been omitted. The same or similar reference numerals designate the same or similar elements as the fourth embodiment.

Referring to FIG. 12, there is illustrated a vacuum servo unit 10 wherein a spring 12j is interposed between the hooked portion 12c and the cylindrical portion 12b which urges the hooked portion 12c in the frontward direction (the leftward direction in FIG. 12).

During normal braking, when the brake pedal is depressed, the valve mechanism 34 is switched to its output increase mode, thereby advancing the power piston 22. Since the hooked portion 12c is urged by the spring 12j in the frontward direction during the advance movement of the power piston 22, the hooked portion 12c is moved together with the power piston 22.

Such unitary movement of the power piston 22 and the hooked portion 12c allows the hooked portion 12c not to be engaged with the brake pedal itself or the portion at which the brake pedal and the input rod 27 are engaged, thereby smoothing brake pedal depression.

During the automatic braking mode, the advance movement of the power piston 22 attempts to establish concurrent movement thereof with the hooked portion 12c. Because the hooked portion 12c engages the engaging portion 272g, to which is applied the urging force of the return spring for urging the brake pedal to its initial position, the initial state of the hooked portion 12c remains unchanged.

The urging force of the spring 12j is less than the urging force of the spring for bringing the brake pedal to its initial position, which permits the hooked portion 12c not to follow the power piston 22 during forward movement, thereby maintaining unchanged the initial state of the hooked portion 12c.

As mentioned above, according to the vacuum servo unit 10 of the sixth embodiment, when the power piston 22 advances during normal braking operation, the hooked portion 12c moves together therewith, thereby establishing smooth brake pedal depression.

The invention has thus been shown and described with reference to specific embodiments, however, it should be understood that the invention is in no way limited to the details of the illustrates structures but changes and modifications may be made without departing from the scope of the appended claims.

What is claimed is:

1. A vacuum servo unit for a vehicle brake system comprising:

a housing defining at least a pressure space therein and defining an axial direction:

a movable wall provided in the housing capable of advancement and retraction along the axial direction of the housing, the movable wall dividing de pressure space into a front chamber and a rear chamber;

a power piston coupled to the movable wall;

an input member fitted in the power piston so as to be movable back and forth along the axial direction of the housing;

an input rod having a front portion and a rear portion, the front portion being coupled to the input member, the rear portion capable of being coupled to a brake operation member, the front portion being in engagement with the rear portion within the power piston in such a manner that the front portion is movable relative to the rear portion, the input rod being movable along the axial direction of the housing together with the brake operation member;

a valve mechanism having an atmosphere valve and a negative pressure valve, the valve mechanism establishing fluid communication between the rear chamber and the atmospheric pressure by opening the atmosphere valve which provides advancing power to the power piston simultaneous with an interruption fluid communication between the rear chamber and the front chamber caused by closing the negative pressure valve when a stroke of the input member caused by the depression of the brake operation member exceeds a set value;

an output member for outputting the advancing power of the power piston caused by the depression of the brake operation member;

an actuator providing a different advancing power to the power piston independent of the brake operation member;

retaining means for holding an initial condition of both the front portion and the rear portion, the retaining means comprising an engaging portion on the rear portion and a hooked member on the housing; and wherein the engaging portion on the rear portion is movable forth-and-back relative to the rear portion.

2. A vacuum servo unit as set forth in claim 1, wherein when the power piston is advanced due to the different power from the actuator, the input member and the front portion of the input rod moving together with the power piston.

3. A vacuum servo unit as set forth in claim 1, wherein the atmosphere valve includes an atmosphere valve seat formed in the input member which is moved by the actuator, and an atmosphere seal member which is engageable and disengageable with the atmosphere valve seat, the atmosphere valve interrupting fluid communication between the rear chamber and atmospheric pressure while the atmosphere seal member is in engagement with the atmosphere valve seat, the atmosphere valve establishing fluid communication between the rear chamber and atmospheric pressure when the atmosphere seal member is out of engagement with the atmosphere valve seat, the negative pressure valve including a negative pressure valve seat formed in the power piston and a negative pressure seal member which is engageable and disengageable with the negative pressure valve seat, the negative pressure valve interrupting fluid communication between the front chamber and the rear chamber when the negative pressure seal member is in engagement with the negative pressure valve seat, the negative pressure valve establishing fluid communication between the front chamber and the rear chamber when the negative pressure seal member is out of engagement with the negative pressure valve seat.

4. A vacuum servo unit as set forth in claim 1, wherein the front portion of the inpour rod includes an axially extending blind bore that telescopically receives a distal end of the rear portion of the input member.

5. A vacuum servo unit as set forth in claim 1, further comprising means for preventing dust from entering the telescopic arrangement of the front portion and the rear portion.

6. A vacuum servo unit as set forth in claim 1, wherein a space defined between the distal end of the rear portion of the input rod and a bottom of the blind bore is connected to an inner side of the power piston.

7. A vacuum servo unit as set forth in claim 1, further comprising a restriction member for restricting relative movement between the front portion and the rear portion.

8. A vacuum servo unit as set forth in claim 7, wherein at least a part of the rear portion extends rearwardly through a rear opening of the power piston, and including a covering member engaging the part of the rear portion that extends rearwardly through the rear opening of the power piston, the covering member covering the rear opening of the power piston.

9. A vacuum servo unit as set forth in claim 1, including a seal ring located between an inner surface of the blind bore and an outer surface of the distal end of the rear portion of the input rod.

10. A vacuum servo unit as set forth in claim 1, wherein the hooked member advances together with and in advance of the power piston.

11. A vacuum servo unit as set forth in claims 10, further comprising a friction member on tile hooked member which generates friction between the hooked member and the power piston.

12. A vacuum servo unit as set forth in claim 1, further comprising urging means on the hooked member for frontwardly urging the hooked member.

13. A vacuum servo unit as set forth in claim 1, wherein the input rod is connected to the input member with a swivel connection, the engaging portion and the hooked member are engaged with each other face to face, a center of each of the faces of the hooked member and the engaging portion coinciding with a center of the swivel connection.

14. A vacuum servo unit as set forth in claim 1, wherein the engaging portion includes a thread portion attached to the rear portion and a hook engageable with the hooked member.

15. A vacuum servo unit as set forth in claim 1, wherein the hooked member is movable back and forth relative to the housing.

16. A vacuum servo unit as set forth in claim 1, wherein one of the front portion and the rear portion includes an axially extending blind bore for telescopically receiving a distal end of the other of the front portion and the rear portion.

\* \* \* \* \*